(12) United States Patent
Cho et al.

(10) Patent No.: US 10,084,368 B2
(45) Date of Patent: Sep. 25, 2018

(54) MOTOR DRIVING APPARATUS

(71) Applicant: Samsung Electronics Co., Ltd., Gyeonggi-do (KR)

(72) Inventors: Je Hyung Cho, Gyeonggi-do (KR); Sun Jin Kim, Gyeonggi-do (KR); Han Sol Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 15/069,958

(22) Filed: Mar. 14, 2016

(65) Prior Publication Data

US 2016/0268951 A1    Sep. 15, 2016

(30) Foreign Application Priority Data

Mar. 13, 2015    (KR) .................. 10-2015-0034741

(51) Int. Cl.
| | |
|---|---|
| H02P 25/00 | (2006.01) |
| H02M 1/14 | (2006.01) |
| H02P 27/14 | (2006.01) |
| H02M 7/483 | (2007.01) |

(52) U.S. Cl.
CPC .............. H02M 1/14 (2013.01); H02M 7/483 (2013.01); H02P 27/14 (2013.01)

(58) Field of Classification Search
CPC ........ H02P 27/06; H02P 27/14; H02M 7/483; H02M 1/14
USPC ............................................. 318/400.14, 504
See application file for complete search history.

(56) References Cited

U.S. PATENT DOCUMENTS

| | | | |
|---|---|---|---|
| 2006/0066283 A1* | 3/2006 | Ota .................. | H02M 5/4585 318/803 |
| 2006/0245216 A1* | 11/2006 | Wu .................. | H02M 7/487 363/13 |
| 2009/0237962 A1 | 9/2009 | Yun | |
| 2009/0309528 A1* | 12/2009 | Hanada ............. | B60L 11/18 318/400.32 |
| 2011/0094075 A1 | 4/2011 | Lee et al. | |

(Continued)

FOREIGN PATENT DOCUMENTS

| | | |
|---|---|---|
| EP | 2104218 A2 | 9/2009 |
| EP | 2375556 A1 | 10/2011 |
| JP | H02261063 A | 10/1990 |
| JP | 2009-296861 | 12/2009 |
| KR | 10-2013-0088606 | 8/2013 |

OTHER PUBLICATIONS

International Search Report dated Jun. 22, 2016 in connection with International Application No. PCT/KR2016/002288, 3 pages.

(Continued)

*Primary Examiner* — Eduardo Colon Santana
*Assistant Examiner* — Gabriel Agared

(57) ABSTRACT

A motor driving apparatus includes an AC-DC conversion unit configured to rectify an AC power supplied from an external AC power source, a DC link unit configured to stabilize a voltage rectified by the AC-DC conversion unit, and a DC-AC conversion unit configured to supply the AC power to a motor using the DC voltage from the DC link unit. The DC link unit may include one pair of film capacitors configured to remove a ripple of the rectified voltage, and the DC-AC conversion unit may include a 3-level inverter receiving the DC voltage from the one pair of film capacitors to supply the AC power to the motor.

17 Claims, 28 Drawing Sheets

(56) References Cited

U.S. PATENT DOCUMENTS

| | | | |
|---|---|---|---|
| 2011/0249479 A1* | 10/2011 | Capitaneanu | H02M 7/487 363/132 |
| 2014/0203740 A1 | 7/2014 | Ogawa | |
| 2014/0301041 A1* | 10/2014 | Kitanaka | H02M 7/003 361/697 |

OTHER PUBLICATIONS

Salcone et al.; "Selecting Film Bus Link Capacitors for High Performance Inverter Applications"; 2009 IEEE International Electric Machines and Drives Conference (IEMDC); Miami, Florida; May 3-6, 2009; 8 pages.

Wen et al.; "Comparative Evaluation of DC-Link Capacitors for Electric Vehicle Application"; 2012 IEEE International Symposium on Industrial Electronics (ISIE); Hangzhou, China; May 28-31, 2012; 6 pages.

Karanayil et al.; "Evaluation of DC-link Decoupling Using Electrolytic or Polypropylene Film Capacitors in Three-Phase Grid-Connected Photovoltaic Inverters"; IECON 2013-39th Annual Conference of the IEEE Industrial Electronics Society; Vienna, Austria, Nov. 10-13, 2013; 7 pages.

Foreign Communication from Related Counterpart Application; European Patent Application No. 16765179.3; Extended European Search Report and European Search Opinion dated Jan. 11, 2018; 9 pages.

* cited by examiner (a)

(b)

MOTOR DRIVING APPARATUS

CROSS-REFERENCE TO RELATED APPLICATION AND CLAIM OF PRIORITY

The present application is related to and claims the benefit of Korean Patent Application No. 10-2015-0034741, filed on Mar. 13, 2015 in the Korean Intellectual Property Office, the disclosure of which is incorporated herein by reference.

TECHNICAL FIELD

The disclosed relates to a motor driving apparatus, and more particularly, to a motor driving apparatus to drive/control a three-phase motor.

BACKGROUND

Motors are not only being widely used in home appliances such as a washing machine, a refrigerator, an air conditioner, a vacuum cleaner, and the like but are also being used in an electric vehicle, a hybrid vehicle, and the like, which are recently gaining attention.

Among types of motors, a permanent magnet motor that uses a permanent magnet rotates a rotor using a magnetic interaction between a magnetic field generated by a coil through which a current flows and a magnetic field generated by the permanent magnet.

A driving apparatus such as an inverter capable of applying a driving voltage is required to drive the permanent magnet motor. Since a magnetic field generated by the rotor of the permanent magnet motor is determined in accordance with a position of the rotor, the inverter has to apply a driving voltage in consideration of the position of the rotor.

In addition, an alternating current (AC) power having a set frequency is supplied to households and businesses. Compared to this, the motor driving apparatus supplies an AC power capable of changing a frequency and level to the permanent magnet motor, thereby rotating the permanent magnet motor.

For this, a commercially used AC power is rectified to be converted into a direct current (DC) power, and the DC power is reconverted into an AC power of a desired frequency and level using the driving apparatus such as the inverter.

Here, an electrolytic capacitor is widely being used for stabilizing the DC power rectified from the AC power. However, the electrolytic capacitor has a problem of having a short life. Also, although a high-capacity capacitor is used to supply a stable DC power, the high-capacity capacitor has a problem of having a large volume.

SUMMARY

To address the above-discussed deficiencies, it is a primary object to provide a motor driving apparatus having sufficient life and a small volume.

Another aspect of the disclosure is to provide a motor driving apparatus capable of stably providing a DC voltage and a neutral point voltage to a 3-level inverter even when a low-capacity capacitor is used at a DC terminal.

According to one aspect of the disclosure, a motor driving apparatus includes an AC-DC conversion unit configured to rectify an AC power supplied from an external AC power source, a DC link unit configured to stabilize a voltage rectified by the AC-DC conversion unit, and a DC-AC conversion unit configured to supply the AC power to a motor using the DC voltage from the DC link unit. The DC link unit may include at least one film capacitor to remove a ripple of the rectified voltage, and the DC-AC conversion unit may include a 3-level inverter to supply the AC power to the motor using the DC voltage of the at least one film capacitor.

According to an embodiment, the DC link unit may include a first film capacitor and a second film capacitor connected to each other in series, and may output a DC voltage between the first film capacitor and the second film capacitor, and a neutral point voltage between both ends of the second film capacitor.

According to an embodiment, the DC-AC conversion unit may further include a control module configured to control the AC power supplied to the motor, the DC voltage, and the neutral point voltage.

According to an embodiment, the control module may include a motor speed control module to control the 3-level inverter such that the motor rotates at a target speed input from an external device, a DC voltage control module to control the 3-level inverter such that the DC voltage is stabilized, and a neutral point voltage control module to control the 3-level inverter such that the neutral point voltage is stabilized.

According to an embodiment, the motor speed control module may output a voltage reference to control the 3-level inverter in accordance with the target speed input from the external device and a driving current output by the 3-level inverter.

According to an embodiment, the motor speed control module may include a speed controller configured to calculate a current reference from a difference between the target speed and a rotation speed of the motor, and a current controller configured to calculate the voltage reference from a difference between the current reference and the driving current.

According to an embodiment, the DC voltage control module may output a damping voltage according to the DC voltage and the voltage reference, to prevent divergence of the DC voltage.

According to an embodiment, the DC voltage control module may calculate the damping voltage from a difference between an average value of voltages applied from the external AC power source and the DC voltage.

According to an embodiment, the neutral point voltage control module may output an offset voltage according to the DC voltage, the neutral point voltage, the voltage reference, and a current reference, to reduce pulsation of the neutral point voltage.

According to an embodiment, the neutral point voltage control module may include a neutral point current calculator configured to calculate a neutral point current from the DC voltage and the neutral point voltage, and an offset voltage calculator configured to calculate an offset voltage, which stabilizes the neutral point voltage, from the current reference, the neutral point current, and the voltage reference.

According to an embodiment, the 3-level inverter may include a 6-switch inverter module configured to receive the DC voltage from both ends of the first film capacitor and the second film capacitor and to supply an AC power to the motor via a U-phase terminal, a V-phase terminal, and a W-phase terminal, and a neutral point switch module configured to receive the neutral point voltage from a neutral point at which the first film capacitor and the second film capacitor are connected and to supply the AC power to the motor via a U-phase terminal, a V-phase terminal, and a W-phase terminal.

According to an embodiment, the 6-switch inverter module may include three upper switching elements connected to the first film capacitor and three lower switching elements connected to the second film capacitor. The three upper switching elements and the three lower switching elements may be respectively connected in series, and three output nodes to which the three upper switching elements and the three lower switching elements are connected in series may be respectively connected to the U-phase terminal, the V-phase terminal, and the W-phase terminal.

According to an embodiment, the neutral point switch module may include three pairs of switching elements respectively provided between the U-phase terminal and the neutral point, between the V-phase terminal and the neutral point, and between the W-phase terminal and the neutral point.

According to an embodiment, the 6-switch inverter module and the neutral point switch module may be configured on separate chips.

According to an embodiment, the 6-switch inverter module and the neutral point switch module may be configured on one chip.

According to an embodiment, the U-phase terminal, the V-phase terminal, and the W-phase terminal of the 6-switch inverter module may be respectively connected to the U-phase terminal, the V-phase terminal, and the W-phase terminal of the neutral point switch module.

According to an embodiment, the DC-AC conversion unit may further include a driving circuit to receive a control signal from the control module and drive the 3-level inverter, and the driving circuit may include a plurality of gate drivers to respectively provide driving signals to the plurality of switching elements included in the 3-level inverter.

According to an embodiment, the motor driving apparatus may further include a DC power source unit to supply a DC power to the control module and the driving circuit.

According to an embodiment, the DC power source unit may include a single-phase rectifying circuit configured to rectify the AC power, a DC link circuit configured to stabilize the voltage rectified by the single-phase rectifying circuit, and a DC-DC conversion circuit configured to change a voltage value of the DC voltage applied from the DC link circuit to apply the DC power having the changed voltage value to each of the plurality of gate drivers.

According to an embodiment, the plurality of switching elements and the plurality of gate drivers may be classified into a plurality of groups depending on whether emitter terminals of the switching elements are connected to each other.

According to an embodiment, the DC power source unit may supply an independent DC power to each of the gate drivers belonging to the plurality of groups.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. Hereinafter, an embodiment of the disclosure will be described in detail with reference to the accompanying drawings.

Figure 1:
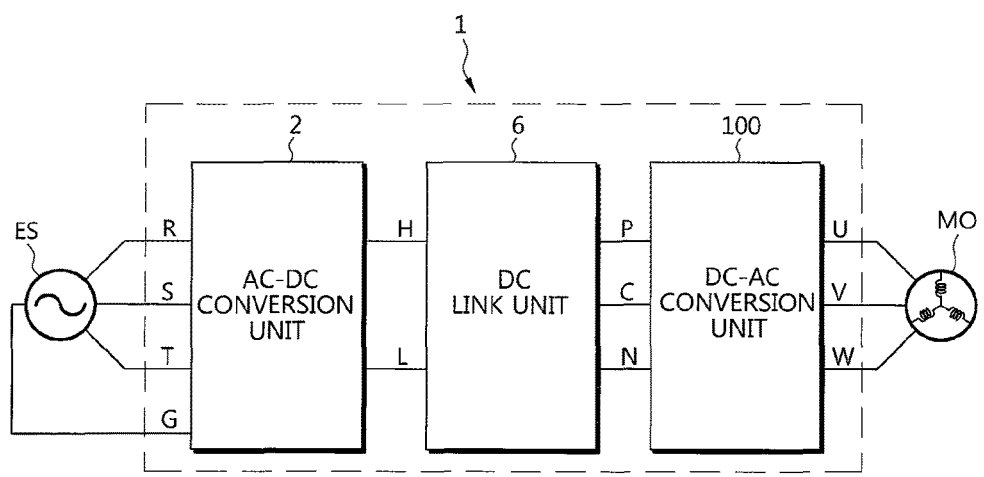
FIG. 1 illustrates a motor driving apparatus according to an embodiment.

FIG. 1 illustrates a motor driving apparatus according to an embodiment.

Referring to FIG. 1, a motor driving apparatus 1 according to the embodiment receives an AC power from an external power source ES and supplies a driving power to a motor MO in order to rotate the motor MO.

Here, the external power source ES may be a single-phase AC power of 110V or 220V widely used for households or a three-phase AC power of 380V, 400V, or 460V widely used for industrial applications. Also, the external power source ES may be a DC power supplied by a solar generator and the like.

In addition, the motor MO may be a permanent magnet synchronous motor including a permanent magnet or an induction motor using electromagnetic induction.

The permanent magnet synchronous motor may include a rotor having a permanent magnet and a stator having a coil. A rotating magnetic field is generated when an AC current is supplied to the coil, and the rotor may rotate by a magnetic interaction between a magnetic field of the permanent magnet and the rotating magnetic field of the coil.

The induction motor includes a rotor which is a conductor and a stator having a coil. When the AC current is supplied to the coil, an induction current is generated at the rotor conductor together with the rotating magnetic field. Also, the rotor may rotate by a magnetic interaction between a magnetic field generated by the induction current and a magnetic field generated by the coil.

In addition, the motor MO may include a Hall sensor to detect a rotational displacement of the rotor. The Hall sensor is disposed at a proper position of the stator included in the motor MO to detect a change in the magnetic field in accordance with the rotation of the rotor, and detect a position of the rotor according to the detected change in the magnetic field.

A configuration to detect the rotational displacement of the rotor of the motor MO is not limited to the Hall sensor.

For example, the motor MO may include an encoder. The encoder may output pulse type signals in accordance with the rotation of the rotor to detect the rotational displacement or the rotation speed of the rotor based on a cycle and a number of the pulses.

In another example, the motor MO may include a resolver. The resolver may output typical waves in accordance with the rotation of the rotor and detect the rotational displacement or the rotation speed of the rotor based on the cycle and the number of the typical waves.

The motor MO provides the detected rotational displacement of the rotor to the motor driving apparatus 1 to be described below.

The motor driving apparatus 1 includes an AC-DC conversion unit 2 to convert an AC voltage and an AC current applied from the external power source ES into a DC voltage and a DC current, a DC-AC conversion unit 100 to convert the converted DC voltage and DC current to an AC voltage and an AC current having a specific frequency, and a DC link unit 6 provided between the AC-DC conversion unit 2 and the DC-AC conversion unit 100 to stabilize a DC voltage Vdc output by the AC-DC conversion unit 2 to transmit the DC voltage Vdc to the DC-AC conversion unit 100.

The AC-DC conversion unit 2 receives a three-phase AC power from the external power source ES via an R-phase terminal R, an S-phase terminal S, a T-phase terminal T, and a ground terminal G, and rectifies the three-phase AC power to output the DC voltage Vdc and the DC current between a positive terminal H and a negative terminal L. Here, the ground terminal G between the external power source ES and the AC-DC conversion unit 2 is optional. In other words, when the external power source ES does not include a ground terminal, the AC-DC conversion unit 2 may not include the ground terminal G.

The DC link unit 6 is input with the DC voltage Vdc and the DC current between the positive terminal H and the negative terminal L from the AC-DC conversion unit 2, and outputs a stabilized DC voltage Vdc and DC current via a positive DC terminal P, a neutral terminal C, and a negative DC terminal N by removing a ripple of the DC voltage Vdc.

The DC-AC conversion unit 100 is input with the DC voltage Vdc and the DC current from the DC link unit 6, and supplies the three-phase AC power including a U-phase, a V-phase, and a W-phase to the motor MO by pulse width modulation.

The motor driving apparatus 1 converts the AC power of the external power source ES into an AC power having a specific frequency and supplies the converted AC power to the motor MO in order to rotate the motor MO and control the rotation speed of the motor MO.

Hereinafter, the AC-DC conversion unit 2, the DC link unit 6, and the DC-AC conversion unit 100 that form the motor driving apparatus 1 will be described in more detail.

Figure 2:
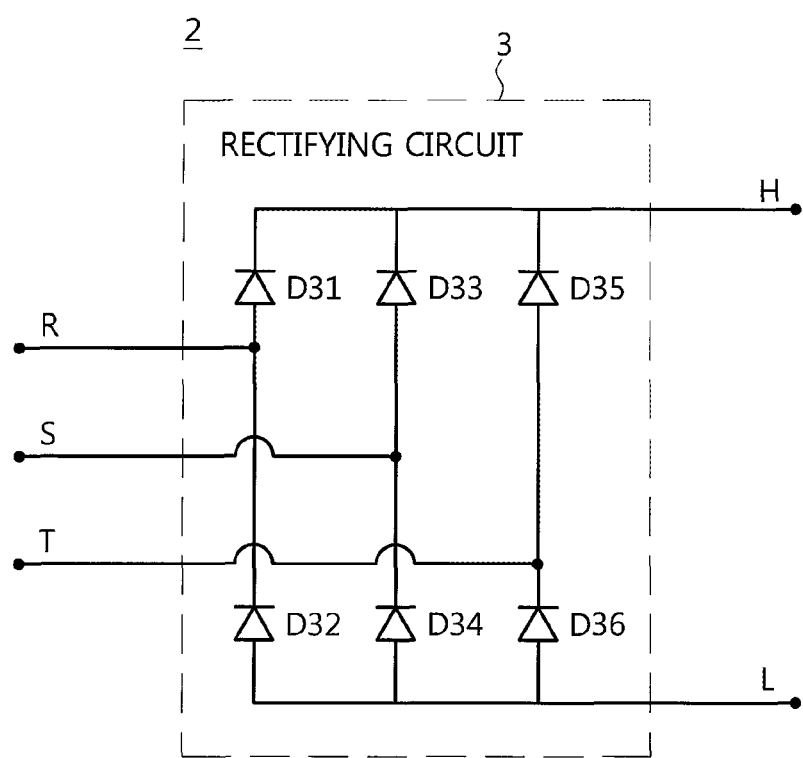
FIG. 2 illustrates an example of an AC-DC conversion unit included in the motor driving apparatus according to an embodiment.
Figure 3:
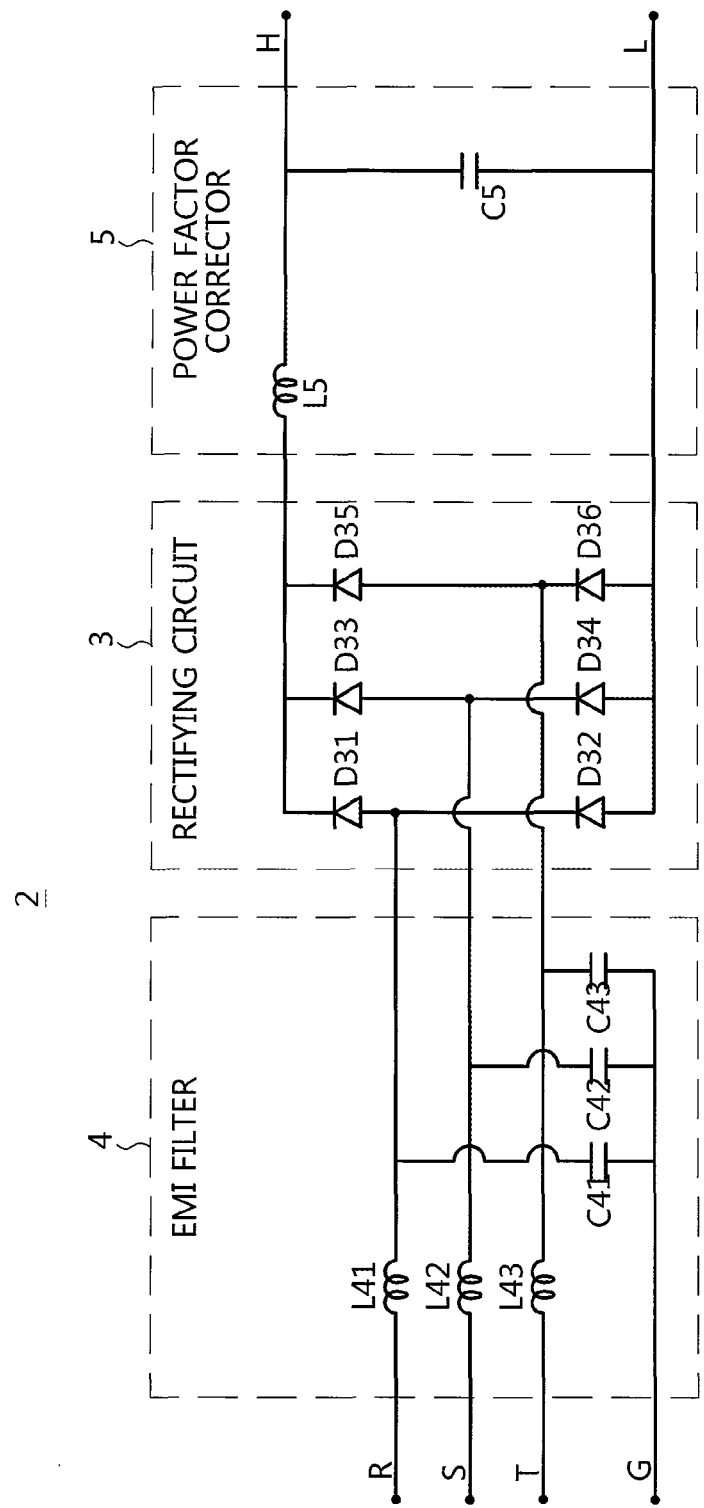
FIG. 3 illustrates another example of an AC-DC conversion unit included in the motor driving apparatus according to an embodiment.

FIG. 2 illustrates an example of an AC-DC conversion unit included in the motor driving apparatus according to an embodiment, and FIG. 3 illustrates another example of an AC-DC conversion unit included in the motor driving apparatus according to an embodiment.

As illustrated in FIG. 2, the AC-DC conversion unit 2 may include a rectifying circuit 3 to rectify the AC power of the external power source ES.

The rectifying circuit 3 may employ a diode bridge including six diodes D31 to D36. Specifically, three upper diodes D31, D33, and D35 are connected to the positive terminal H, and three lower diodes D32, D34, and D36 are connected to the negative terminal L.

In addition, the three upper diodes D31, D33, and D35 and the three lower diodes D32, D34, and D36 are connected in series by one-to-one correspondence, and three connection nodes, through which the three upper diodes D31, D33, and D35 and the three lower diodes D32, D34, and D36 are connected in series, are respectively connected to the R-phase terminal R, the S-phase terminal S, and the T-phase terminal T of the external power source ES.

Here, the six diodes D31 to D36 are disposed such that the AC voltage being applied from the external power source ES is applied in one direction and the AC current is supplied in another direction. In other words, as illustrated in FIG. 2, each of the six diodes D31 to D36 is disposed such that the AC voltage applied from the external power source ES is applied to the positive terminal H and the AC current flows toward the positive terminal H.

A configuration of the AC-DC conversion unit 2 is not limited to the rectifying circuit 3.

As illustrated in FIG. 3, the AC-DC conversion unit 2 may further include an electromagnetic interference filter (EMI filter) 4 to remove noise included in the AC power supplied from the external power source ES and a power factor corrector (PFC) 5 to improve a power factor in addition to the rectifying circuit 3.

As illustrated in FIG. 3, the EMI filter 4 may be provided at a front end of the rectifying circuit 3, and may remove high-frequency noise included in the AC power supplied from the external power source ES.

The EMI filter 4 generally has a form of a low pass filter that blocks a high-frequency signal and allows a low-frequency signal to pass in order to remove the high-frequency noise. For example, as illustrated in FIG. 3, the EMI filter 4 may include three inductors L41, L42, and L43 respectively connected in series to the R-phase terminal R, the S-phase terminal S, and the T-phase terminal T to which power is supplied from the external power source ES, and three capacitors C41, C42, and C43 provided between the three inductors L41, L42, and L43 and the ground terminal G.

However, the EMI filter 4 illustrated in FIG. 3 is merely an example of a filter that may be employed, and the EMI filter 4 may have various configurations. Specifically, the EMI filter 4 may not only have a series-shunt configuration illustrated in FIG. 3 but also a shunt-series configuration, an II configuration, and a T-configuration.

The PFC 5 may be provided at a rear end of the rectifying circuit 3 as illustrated in FIG. 3 to improve a power factor of the motor driving apparatus 1.

The power factor refers to an active power with respect to an apparent power. That is, the power factor may be viewed as a ratio of a power actually used by the motor driving apparatus 1 with respect to a power supplied from the external power source ES. A high power factor signifies that the motor driving apparatus 1 uses a great portion of the power supplied from the external power source ES, and a low power factor signifies that the motor driving apparatus 1 uses only a small portion of the supplied power.

To use the AC power, phases of the AC voltage applied from the external power source ES and the current supplied to the motor driving apparatus 1 should be the same. When the phase of the AC voltage being applied and the phase of the current being supplied are not the same, an efficiency of the power supplied from the external power source ES to the motor driving apparatus 1 may decrease or the power may not be supplied. The power that cannot be used by the motor driving apparatus 1 due to the phase of the AC voltage being applied and the phase of the current being supplied not being the same is referred to as a reactive power, and the power transmitted to the motor driving apparatus 1 due to the phase of the AC voltage being applied and the phase of the current being supplied being the same is referred to as the active power.

The PFC 5 makes the phase of the AC voltage applied from the external power source ES and the phase of the current supplied to the DC link unit 6 and the DC-AC conversion unit 100 to be described below to be the same using an inductor L5 and a capacitor C5. As a result, the PFC 5 may improve the power factor of the AC power supplied from the external power source ES.

However, the PFC 5 is not limited to a passive PFC illustrated in FIG. 3. For example, the PFC 5 may employ an active PFC including a switch (not shown) and a diode (not shown). Also, the diode (not shown) may be replaced by the switch (not shown).

Furthermore, the PFC 5 is not limited to being provided at the rear end of the rectifying circuit 3, and the PFC 5 may be provided at the front end of the rectifying circuit 3 or integrally provided with the rectifying circuit 3.

As described above, the AC-DC conversion unit 2 may include the rectifying circuit 3, the EMI filter 4, and the PFC 5.

Figure 4:
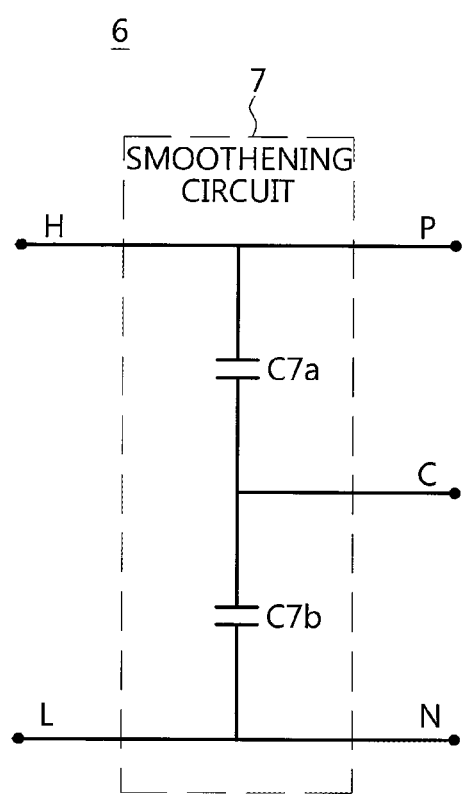
FIG. 4 illustrates an example of a DC link unit included in the motor driving apparatus according to an embodiment.
Figure 5:
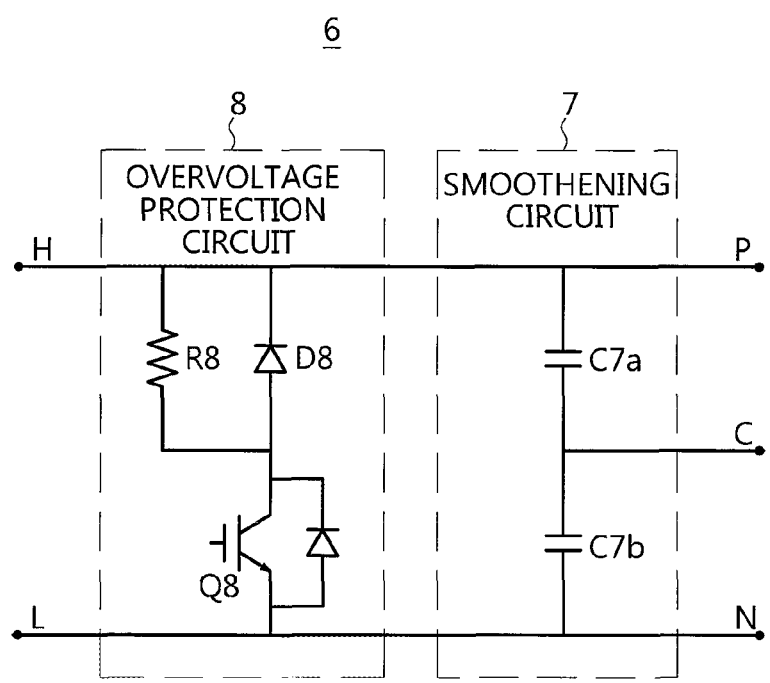
FIG. 5 illustrates another example of a DC link unit included in the motor driving apparatus according to an embodiment.

FIG. 4 illustrates an example of a DC link unit included in the motor driving apparatus according to an embodiment, and FIG. 5 illustrates another example of a DC link unit included in the motor driving apparatus according to an embodiment.

As illustrated in FIG. 4, the DC link unit 6 may include a smoothening circuit 7 to remove a ripple included in the voltage rectified by the AC-DC conversion unit 2.

The smoothening circuit 7 may include an upper capacitor C7a and a lower capacitor C7b connected to each other in series. Here, the pair of capacitors C7a and C7b may have the same capacitance.

The smoothening circuit 7 removes the ripple included in the voltage rectified by the AC-DC conversion unit 2, and outputs the stabilized DC voltage Vdc to the DC-AC conversion unit 100. Specifically, the DC link unit 6 outputs a voltage of the upper capacitor C7a between the positive DC terminal P and the neutral terminal C, and outputs a voltage of the lower capacitor C7b between the neutral terminal C and the negative DC terminal N.

In addition, the smoothening circuit 7 also serves as a DC power source that supplies a DC power to the DC-AC conversion unit 100. Specifically, the pair of capacitors C7a and C7b constituting the smoothening circuit 7 store electrical energy provided by the AC-DC conversion unit 2 and supply the stored electrical energy to the DC-AC conversion unit 100.

In addition, a conventional motor driving apparatus uses a high-capacity capacitor as the smoothening circuit 7 in order to provide a stable DC power to the DC-AC conversion unit 100. For example, the conventional motor driving apparatus uses an electrolytic capacitor having a capacitance of several milli-Farads (mF).

The electrolytic capacitor may obtain a high capacitance per unit volume due to its characteristics. However, the electrolytic capacitor has a large equivalent resistance. Since a high heat loss occurs due to the large equivalent resistance, an electrolyte is evaporated due to the high heat loss, and a lifespan of the capacitor is shortened.

As a result, an acceptable root-mean-square (RMS) current of the electrolytic capacitor is smaller than other capacitors. A plurality of electrolytic capacitors are connected in parallel to increase the RMS current to be acceptable conventionally, however the volume of the motor driving apparatus is enlarged as a result.

Due to this reason, the motor driving apparatus 1 according to the embodiment uses a low-capacity (tens of μF) film capacitor as the smoothening circuit 7 constituting the DC link unit 6. In other words, the pair of capacitors C7a and C7b constituting the smoothening circuit 7 use the low-capacity film capacitor.

The film capacitor has a small equivalent resistance of approximately 1/10 of that of the electrolytic capacitor. As a result, the electrolytic capacitor has approximately 5,000 hours to 10,000 hours of life, whereas the film capacitor has approximately 100,000 hours of life.

The configuration of the DC link unit 6 is not limited to the smoothening circuit 7.

As illustrated in FIG. 5, the DC link unit 6 may further include an overvoltage protection circuit 8 to prevent an overvoltage of the smoothening circuit 7, in addition to the smoothening circuit 7.

The overvoltage protection circuit 8 may include a resistive element R8 to consume power, a diode D8 to prevent a reverse current, and a switching element Q8 that is turned on when an overvoltage is detected. Also, the resistive element R8 and the diode D8 are connected to the positive terminal H in parallel, and the switching element Q8 is connected to the resistive element R8 and the diode D8 in series. Here, the resistive element R8 may employ a resistor having a constant electrical resistance value or a varistor having an electrical resistance value changed in accordance with an applied voltage.

When the overvoltage of the smoothening circuit 7 is detected, the switching element Q8 is turned on, and a current flows from the smoothening circuit 7 via the resistive element R8 and the switching element Q8. As a result, the electrical energy stored in the smoothening circuit 7 is consumed, and the voltage of the smoothening circuit 7 decreases.

As described above, the DC link unit 6 may include the smoothening circuit 7 and the overvoltage protection circuit 8, and particularly, the smoothening circuit 7 includes the upper capacitor C7a and the lower capacitor C7b formed of the film capacitor.

Figure 6:
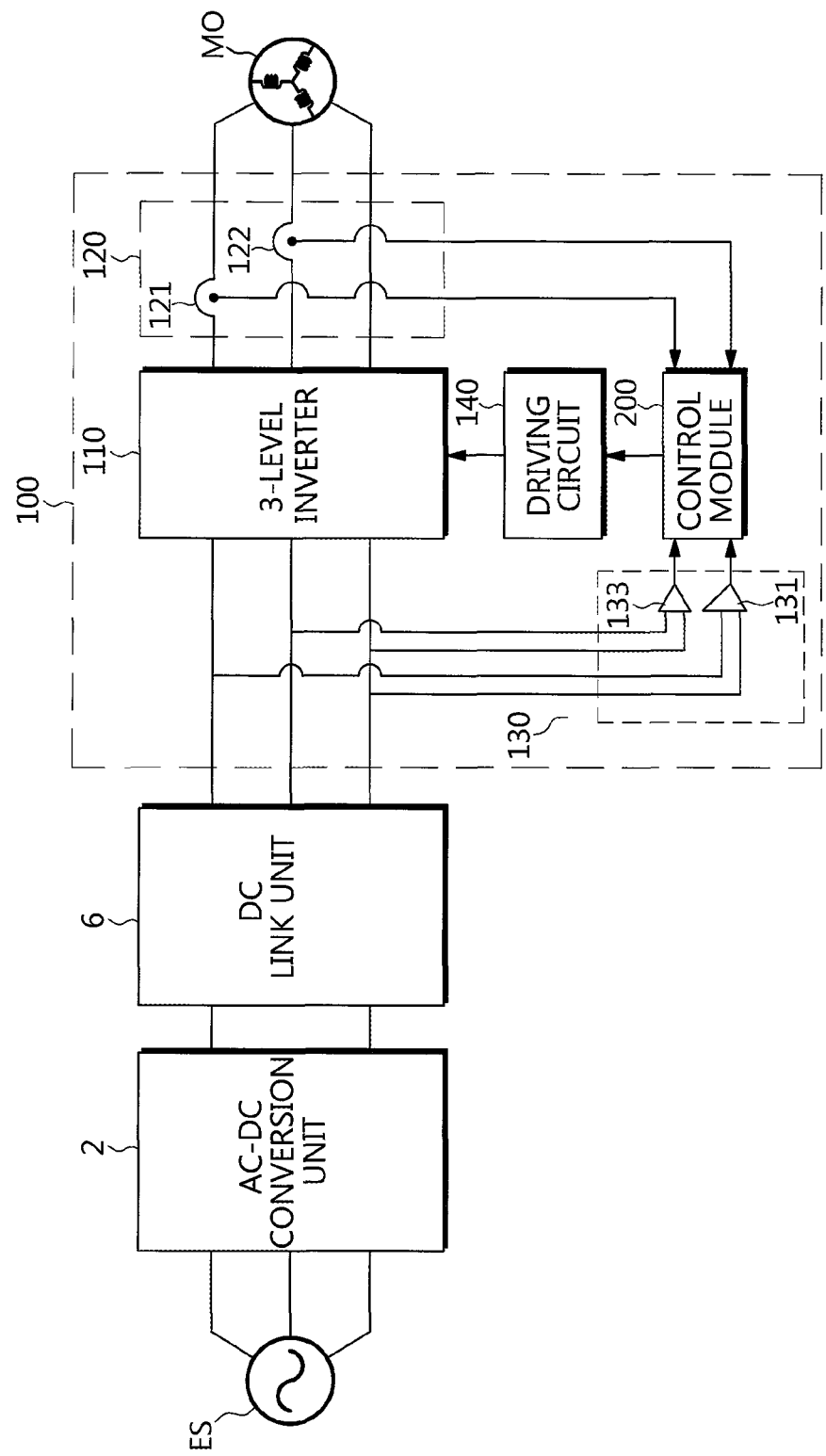
FIG. 6 illustrates a DC-AC conversion unit included in the motor driving apparatus according to an embodiment.
Figure 7:
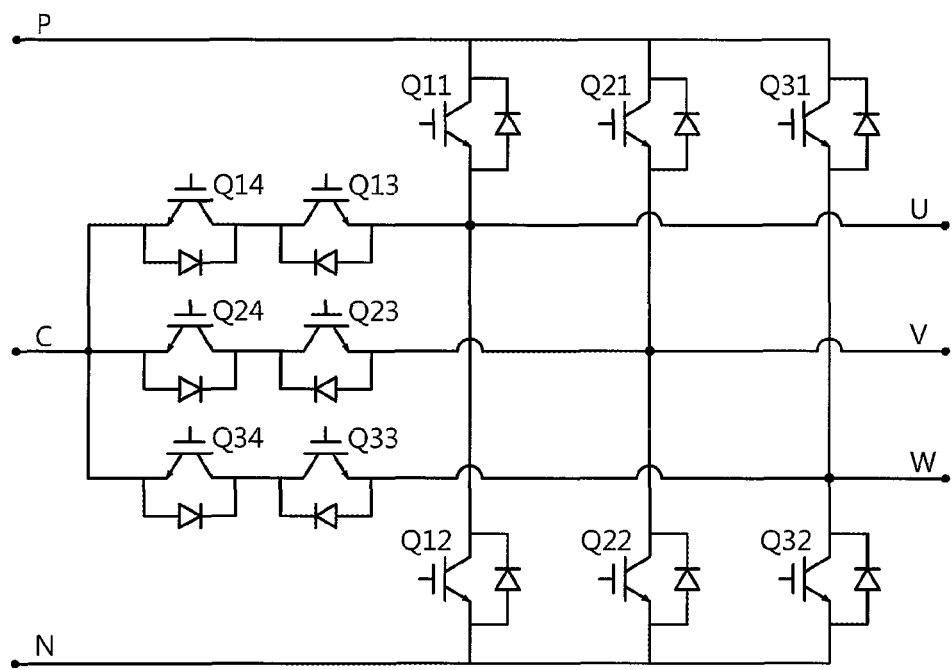
FIG. 7 illustrates an example of a 3-level inverter included in the motor driving apparatus according to an embodiment.
Figure 8:
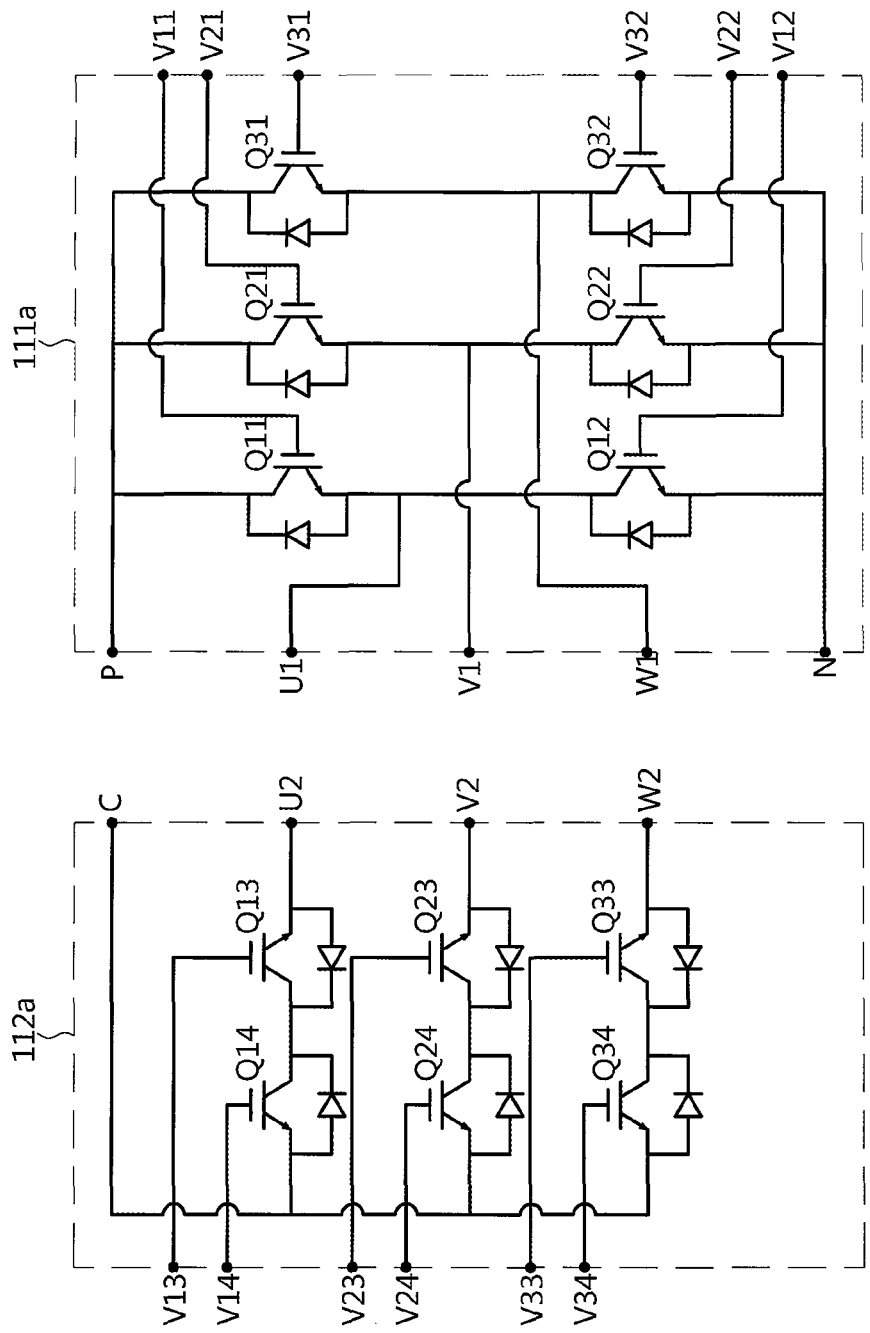
FIG. 8 illustrates a configuration of the 3-level inverter included in the motor driving apparatus according to an embodiment.
Figure 9:
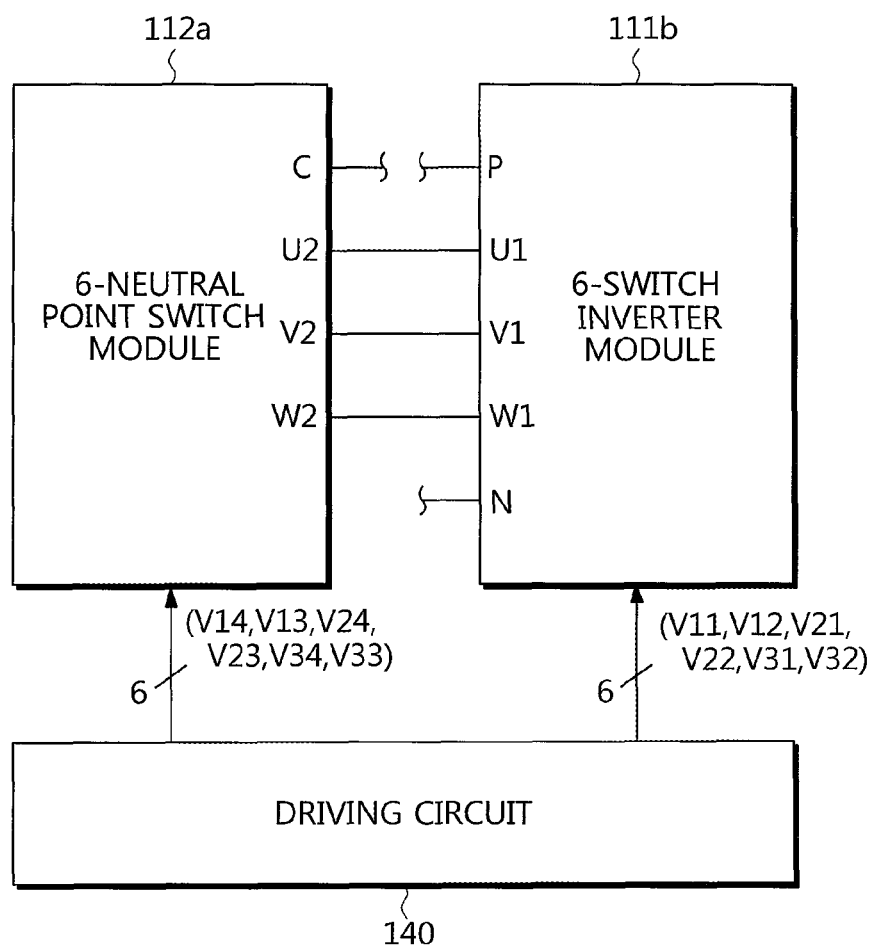
FIG. 9 illustrates a connection of the 3-level inverter included in the motor driving apparatus according to an embodiment.
Figure 10:
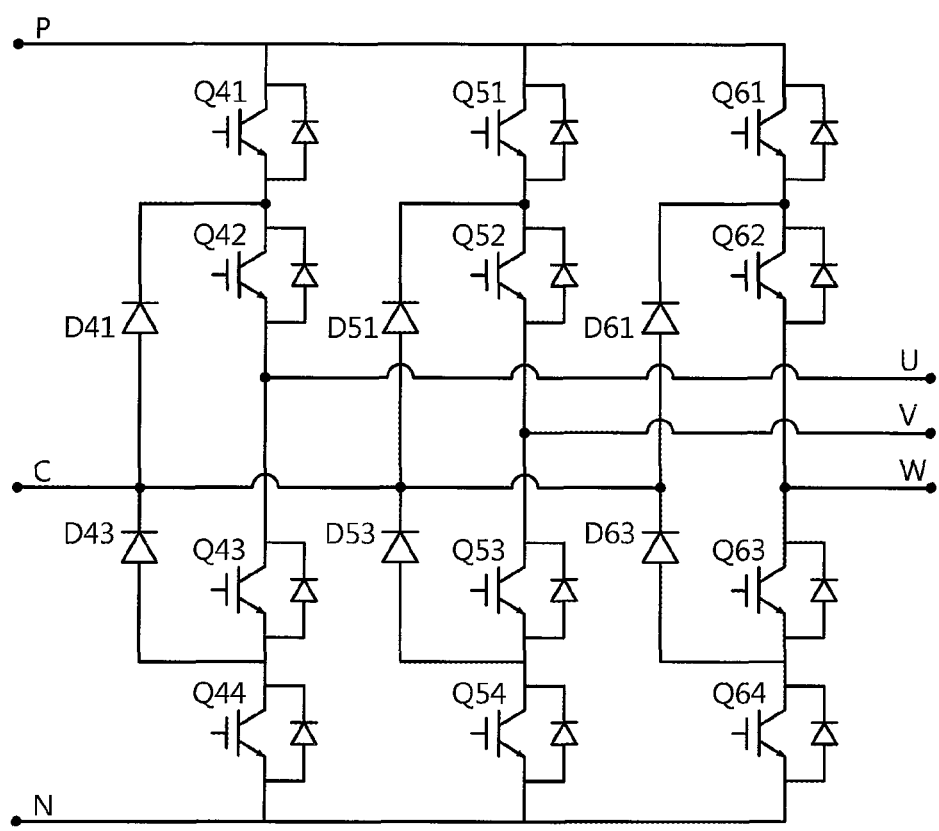
FIG. 10 illustrates another example of a 3-level inverter included in the motor driving apparatus according to an embodiment.

FIG. 6 illustrates a DC-AC conversion unit included in the motor driving apparatus according to an embodiment. Also, FIG. 7 illustrates an example of a 3-level inverter included in the motor driving apparatus according to an embodiment, FIG. 8 illustrates a configuration of the 3-level inverter include in the motor driving apparatus according to an embodiment, and FIG. 9 illustrates a connection of the 3-level inverter included in the motor driving apparatus according to an embodiment. Also, FIG. 10 illustrates another example of the 3-level inverter included in the motor driving apparatus according to an embodiment.

The DC-AC conversion unit 100 includes a 3-level inverter 110 to supply a driving voltage and driving current to the motor MO, a current detection unit 120 to detect the driving current supplied to the motor MO, a voltage detection unit 130 to detect the DC voltage Vdc applied to the 3-level inverter 110, a control module 200 to output a control signal for controlling the 3-level inverter 110 according to the detected results of the current detection unit 120 and the voltage detection unit 130, and a driving circuit 140 to output a driving signal to the 3-level inverter 110 in accordance with the control signal of the control module 200.

The DC voltage Vdc is applied to the 3-level inverter 110 from the DC link unit 6 via the positive DC terminal P, the neutral terminal C, and the negative DC terminal N. Also, the 3-level inverter 110 supplies the driving voltage and the driving current to the motor MO in accordance with the driving signal of the driving circuit 140. Here, the driving voltage and the driving current output by the 3-level inverter 110 have forms of an AC voltage and an AC current.

The 3-level inverter 110 may be realized using various topologies. For example, the 3-level inverter 110 may employ a T-type neutral point clamped inverter 110a, a diode-clamped inverter 110b, and the like.

First, the T-type neutral point clamped inverter 110a illustrated in FIG. 7 will be described.

The T-type neutral point clamped inverter 110a may include six switch inverters Q11, Q12, Q21, Q22, Q31, and Q32, one pair of neutral point switching elements Q14 and Q13 to connect between the neutral terminal C and a U-phase terminal U, one pair of neutral point switching elements Q24 and Q23 to connect between the neutral terminal C and a V-phase terminal V, and one pair of neutral point switching elements Q34 and Q33 to connect between the neutral terminal C and a W-phase terminal W. Here, orders of the pairs of neutral point switching elements Q14 and Q13, Q24 and Q23, and Q34 and Q33 may be changed.

Specifically, first, second, and third upper switching elements Q11, Q21, and Q31 are provided between each of the three output terminals U, V, and W and the positive DC terminal P, and first, second, and third lower switching elements Q12, Q22, and Q32 are provided between each of the three-phase output terminals U, V, and W and the negative DC terminal N.

In addition, as described above, the three pairs of neutral point switching elements Q14 and Q13, Q24 and Q23, and Q34 and Q33 are respectively provided between the three-phase output terminals U, V, and W and the neutral terminal C. Specifically, a first left switching element Q14 and a first right switching element Q13 are provided between the neutral terminal C and the U-phase terminal U, a second left switching element Q24 and a second right switching element Q23 are provided between the neutral terminal C and the V-phase terminal V, and a third left switching element Q34 and a third right switching element Q33 are provided between the neutral terminal C and the W-phase terminal W.

The three upper switching elements Q11, Q21, and Q31, the three lower switching elements Q12, Q22, and Q32, and the three pairs of neutral point switching elements Q14 and Q13, Q24 and Q23, and Q34 and Q33 are opened and closed by the driving signal output by the driving circuit 140.

For example, when a first upper switching element Q11 and a second left switching element Q24 are closed, the driving current may flow to the motor MO from the positive DC terminal P via the first upper switching element Q11 and the U-phase terminal U, and flow to the neutral terminal C from the motor MO via the V-phase terminal V and the second left switching element Q24.

In another example, when the first right switching element Q13 and a second lower switching element Q22 are closed, the driving current may flow to the motor MO from the neutral terminal C via the first right switching element Q13 and the U-phase terminal U, and flow to the negative DC terminal N from the motor MO via the V-phase terminal V and the second lower switching element Q22.

Ultimately, the driving current flows to the neutral terminal C from the positive DC terminal P via the motor MO, or flows to the negative DC terminal N from the neutral terminal C via the motor MO.

The switching elements Q11 to Q14, Q21 to Q24, and Q31 to Q34 that form the T-type neutral point clamped inverter 110a may employ an insulated gate bipolar transistor (IGBT) or a power field effect transistor (Power FET) for blocking or conducting a high voltage and a high current.

The 3-level inverter 110 is not limited to including the T-type neutral point clamped inverter 110a. For example, as illustrated in FIG. 8, the 3-level inverter 110 may include the diode clamped inverter 110b.

As illustrated in FIG. 8, the T-type neutral point clamped inverter 110a may be formed of a 6-switch inverter module 111a and a 6-neutral point switch module 112a. Also, each of the 6-switch inverter module 111a and the 6-neutral point switch module 112a may be formed of an independent chip.

The 6-switch inverter is widely being used commercially. Compared to this, the T-type neutral point clamped inverter 110a is not being as widely used commercially. As a result, the 6-switch type inverter is being supplied in many products with various specifications while the T-type neutral point clamped inverter 110a is not being supplied in many products, and a demand thereof is also low.

In this respect, the T-type neutral point clamped inverter 110a may be generated by combining the 6-switch inverter module 111a formed of six upper/lower switching elements Q11 and Q12, Q21 and Q22, and Q31 and Q32 and the 6-neutral point switch module 112a formed of six neutral point switching elements Q14 and Q13, Q24 an Q23, and Q34 and Q33.

The 6-switch inverter module 111a may have a form of a general 6-switch inverter as illustrated in FIG. 8.

Specifically, a first U-phase terminal U1, a first V-phase terminal V1, and a first W-phase terminal W1 which have a driving current input/output to/from outer portions of the 6-switch inverter module 111a, the positive DC terminal P and the negative DC terminal N to which the DC power is supplied, and a plurality of switching signal terminals V11, V21, V31, V12, V22, and V32 to which the driving signal is input may be provided at the 6-switch inverter module 111a.

The first, second, and third upper switching elements Q11, Q21, and Q31 and the first, second, and third lower switching elements Q12, Q22, and Q32 may be provided in the 6-switch inverter module 111a.

In addition, a node at which the first upper switching element Q11 and a first lower switching element Q12 are connected may be connected to the first U-phase terminal U1, a node at which a second upper switching element Q21 and the second lower switching element Q22 are connected may be connected to the first V-phase terminal V1, and a node at which a third upper switching element Q31 and a third lower switching element Q32 are connected may be connected to the first W-phase terminal W1.

In addition, the first upper switching element Q11 may be opened and closed by the driving signal input via the first upper switching signal terminal V11, the second upper switching element Q21 may be opened and closed by the driving signal input via the second upper switching signal terminal V21, and the third upper switching element Q31 may be opened and closed by the driving signal input via the third upper switching signal terminal V31. Also, the first lower switching element Q12 may be opened and closed by the driving signal input via the first lower switching signal terminal V12, the second lower switching element Q22 may be opened and closed by the driving signal input via the second lower switching signal terminal V22, and the third lower switching element Q32 may be opened and closed by the driving signal input via the third lower switching signal terminal V32.

As illustrated in FIG. 8, a second U-phase terminal U2, a second V-phase terminal V2, and a second W-phase terminal W2 having a driving current input/output to/from outer portions of the 6-neutral point switch module 112a, the neutral terminal C to which the DC power is supplied, and a plurality of switching signal terminals V13, V14, V23, V24, V33, and V34 to which the driving signal is input may be provided at the 6-neutral point switch module 112a.

In addition, the three pairs of neutral point switching elements Q14 and Q13, Q24 and Q23, and Q34 and Q33 may be provided in the 6-neutral switching module 112a. The first left switching element Q14 and the first right switching element Q13 are connected to each other in series, the second left switching element Q24 and the second right switching element Q23 are connected to each other in series, and the third left switching element Q34 and the third right switching element Q33 are connected to each other in series.

In addition, the first left switching element Q14, the second left switching element Q24, and the third left switching element Q34 are connected to the neutral terminal C outside.

In addition, the first right switching element Q13 is connected to the second U-phase terminal U2, the second right switching element Q23 is connected to the second V-phase terminal V2, and the third right switching element Q33 is connected to the second W-phase terminal W2.

In addition, the first left switching element Q14 may be opened and closed by the driving signal input via the first left switching signal terminal V14, and the first right switching element Q13 may be opened and closed by the driving signal input via the first right switching signal terminal V13. Also, the second left switching element Q24 may be opened and closed by the driving signal input via the second left switching signal terminal V24, and the second right switching element Q23 may be opened and closed by the driving signal input via the second right switching signal terminal V23. Also, the third left switching element Q34 may be opened and closed by the driving signal input via the third left switching signal terminal V34, and the third right switching element Q33 may be opened and closed by the driving signal input via the third right switching signal terminal V33.

As above, the T-type neutral point clamped inverter 110a may be formed with a combination of the 6-switch inverter module 111a and the 6-neutral point switch module 112a. Also, each of the 6-switch inverter module 111a and the 6-neutral point switch module 112a may be a single chip mounted on a printed circuit board (PCB).

The 6-switch inverter module 111a and the 6-neutral point switch module 112a may be connected as illustrated in FIG. 9.

Specifically, the first U-phase terminal U1 of the 6-switch inverter module 111a and the second U-phase terminal U2 of the 6-neutral point switch module 112a are connected, the first V-phase terminal V1 of the 6-switch inverter module 111a and the second V-phase terminal V2 of the 6-neutral point switch module 112a are connected, and the first W-phase terminal W1 of the 6-switch inverter module 111a and the second W-phase terminal W2 of the 6-neutral point switch module 112a are connected.

In addition, the positive DC terminal P of the 6-switch inverter module 111a is connected to the positive DC terminal P of the DC link unit 6, and the negative DC terminal N of the 6-switch inverter module 111a is connected to the negative DC terminal N of the DC link unit 6. Also, the neutral terminal C of the 6-neutral point switch module 112a is connected to the neutral terminal C of the DC link unit 6.

The 6-switch inverter module 111a receives the driving signal from the driving circuit 140 via the first upper switching signal terminal V11, the second upper switching signal terminal V21, the third upper switching signal terminal V31, the first lower switching signal terminal V12, the second lower switching signal terminal V22, and the third lower switching signal terminal V32.

In addition, the 6-neutral point switch module 112a receives the driving signal via the first left switching signal terminal V14, the first right switching signal terminal V13, the second left switching signal terminal V24, the second right switching signal terminal V23, the third left switching signal terminal V34, and the third right switching signal terminal V33.

The 3-level inverter 110 is not limited to including the T-type neutral point clamped inverter 110a. For example, the 3-level inverter 110 may include a diode clamped inverter 110b as illustrated in FIG. 10.

Three pairs of upper switching elements Q41 and Q42, Q51 and Q52, and Q61 and Q62 are provided between the positive DC terminal P and the three output terminals U, V, and W, and three pairs of lower switching elements Q43 and Q44, Q53 and Q54, and Q63 and Q64 are provided between the three output terminals U, V, and W and the negative DC terminal N.

Three upper diodes D41, D51, and D61 are respectively provided between nodes at which the three pairs of upper switching elements Q41 and Q42, Q51 and Q52, and Q61 and Q62 are connected with the neutral terminal C, and three lower diodes D43, D53, and D63 are respectively provided between nodes at which the three pairs of lower switching elements Q43 and Q44, Q53 and Q54, and Q63 and Q64 are connected with the neutral terminal C.

In addition, the three pairs of upper switching elements Q41 and Q42, Q51 and Q52, and Q61 and Q62 and the three pairs of lower switching elements Q43 and Q44, Q53 and Q54, and Q63 and Q64 may be opened and closed by the driving signal output from the driving circuit 140.

However, the 3-level inverter 110 is assumed to include the T-type neutral point clamped inverter 110a to assist in understanding the disclosure.

The current detection unit 120 may include at least two current sensors. For example, the current detection unit 120 may include an a-phase current sensor 121 to detect an a-phase current supplied to the motor MO via the U-phase terminal, and a b-phase current sensor 123 to detect a b-phase current supplied to the motor MO via the V-phase terminal. Also, a c-phase current supplied to the motor MO via the W-phase terminal may be calculated by the control module 200 to be described below from the a-phase current and the b-phase current.

The current detection unit 120 is not limited to including the a-phase current sensor 121 and the b-phase current sensor 123. For example, the current detection unit 120 may include the b-phase current sensor to detect the b-phase current and a c-phase current sensor to detect c-phase current, or the current detection unit 120 may include the c-phase current sensor to detect the c-phase current and the a-phase current sensor to detect the a-phase current.

A high current of several amperes (A) to several hundred A is supplied to the motor MO. To detect the high current, the at least two current sensors included in the current detection unit 120 may include a current transformer (CT) to proportionally decrease a level of the driving current and an ampere meter to detect the level of the proportionally decreased current. In other words, the at least two current sensors may detect the driving current by proportionally decreasing the level of the driving current using the CT and measuring the level of the proportionally decreased current.

Although the at least two sensors including the CT and the ampere meter are given as an example related to the current detection unit 120, embodiments are not limited thereto, and the current detection unit 120 may include a current sensor including a shunt resistor.

The voltage detection unit 130 may include a DC point voltage sensor 131 to detect a voltage between the positive DC terminal P and the negative DC terminal N, and a neutral point voltage sensor 133 to detect a neutral point voltage Vdcn between the neutral terminal C and the negative DC terminal N.

When the external power source ES is a three-phase power of 380V, the voltage between the positive DC terminal P and the negative DC terminal N becomes approximately 540V. Also, the voltage between the neutral terminal C and the negative DC terminal N becomes approximately 270V.

To detect the high voltage, the DC point voltage sensor 131 and the neutral point voltage sensor 133 may include a voltage distributor. Specifically, the DC point voltage sensor 131 may proportionally decrease the voltage between the positive DC terminal P and the negative DC terminal N using the voltage distributor, and measure the proportionally decreased voltage. Also, the neutral point voltage sensor 133 may proportionally decrease the voltage between the neutral terminal C and the negative DC terminal N using the voltage distributor, and measure the proportionally decreased voltage.

The driving circuit 140 provides the driving signal for opening and closing the plurality of switches Q11 to Q14, Q21 to Q24, and Q31 to Q34 included in the 3-level inverter 110 to the 3-level inverter 110 in accordance with the control signal of the control module 200 to be described below.

Figure 11:
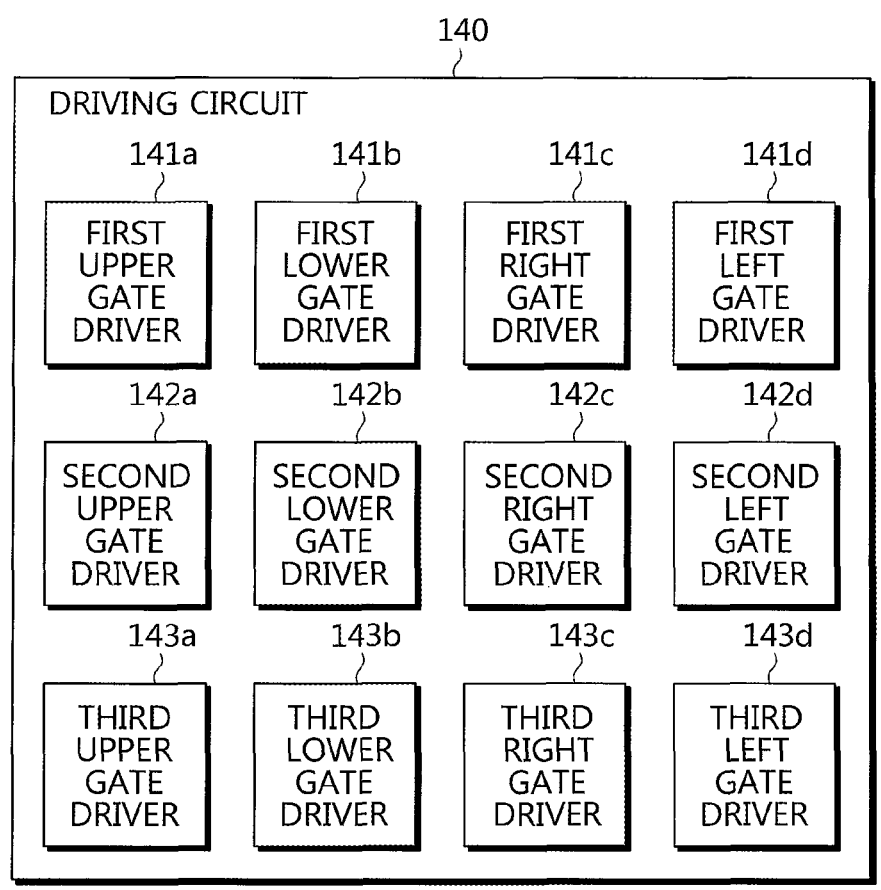
FIG. 11 illustrates a driving circuit included in the motor driving apparatus according to an embodiment.

For example, as illustrated in FIG. 11, the driving circuit 140 may include a plurality of gate drivers 141a to 141d, 142a to 142d, and 143a to 143d for respectively opening and closing the plurality of switches Q11 to Q14, Q21 to Q24, and Q31 to Q34.

Specifically, a first upper gate driver 141a may generate a first upper switching signal to open and close the first upper switching element Q11 of the 3-level inverter 110, a first lower gate driver 141b may generate a first lower switching signal to open and close the first lower switching element Q12, a first right gate driver 141c may generate a first right switching signal to open and close the first right switching element Q13, and a first left gate driver 141d may generate a first left switching signal to open and close the first left switching element Q14.

In addition, a second upper gate driver 142a may generate a second upper switching signal to open and close the second upper switching element Q21, a second lower gate driver 142b may generate a second lower switching signal to open and close the second lower switching element Q22, a second right gate driver 142c may generate a second right switching signal to open and close the second right switching element Q23, and a second left gate driver 142d may generate a second left switching signal to open and close the second left switching element Q24.

In addition, a third upper gate driver 143a may generate a third upper switching signal to open and close the third upper switching element Q31, a third lower gate driver 143b may generate a third lower switching signal to open and close the third lower switching element Q32, a third right gate driver 143c may generate a third right switching signal to open and close the third right switching element Q33, and a third left gate driver 143d may generate a third left switching signal to open and close the third left switching element Q34.

The control module 200 generates the control signal for opening and closing the plurality of switches Q11 to Q14, Q21 to Q24, and Q31 to Q34 included in the 3-level inverter 110 according to an output of the current detection unit 120 and an output of the voltage detection unit 130, and provides the generated control signal to the driving circuit 140.

The configuration and operation of the control module 200 will be described in more detail below.

Figure 12:
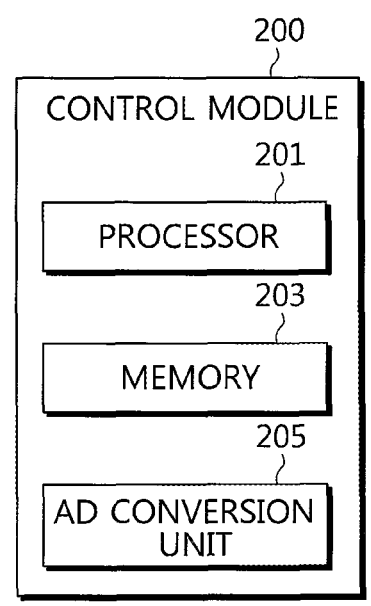
FIG. 12 illustrates a hardware configuration of a control module included in the motor driving apparatus according to an embodiment.
Figure 13:
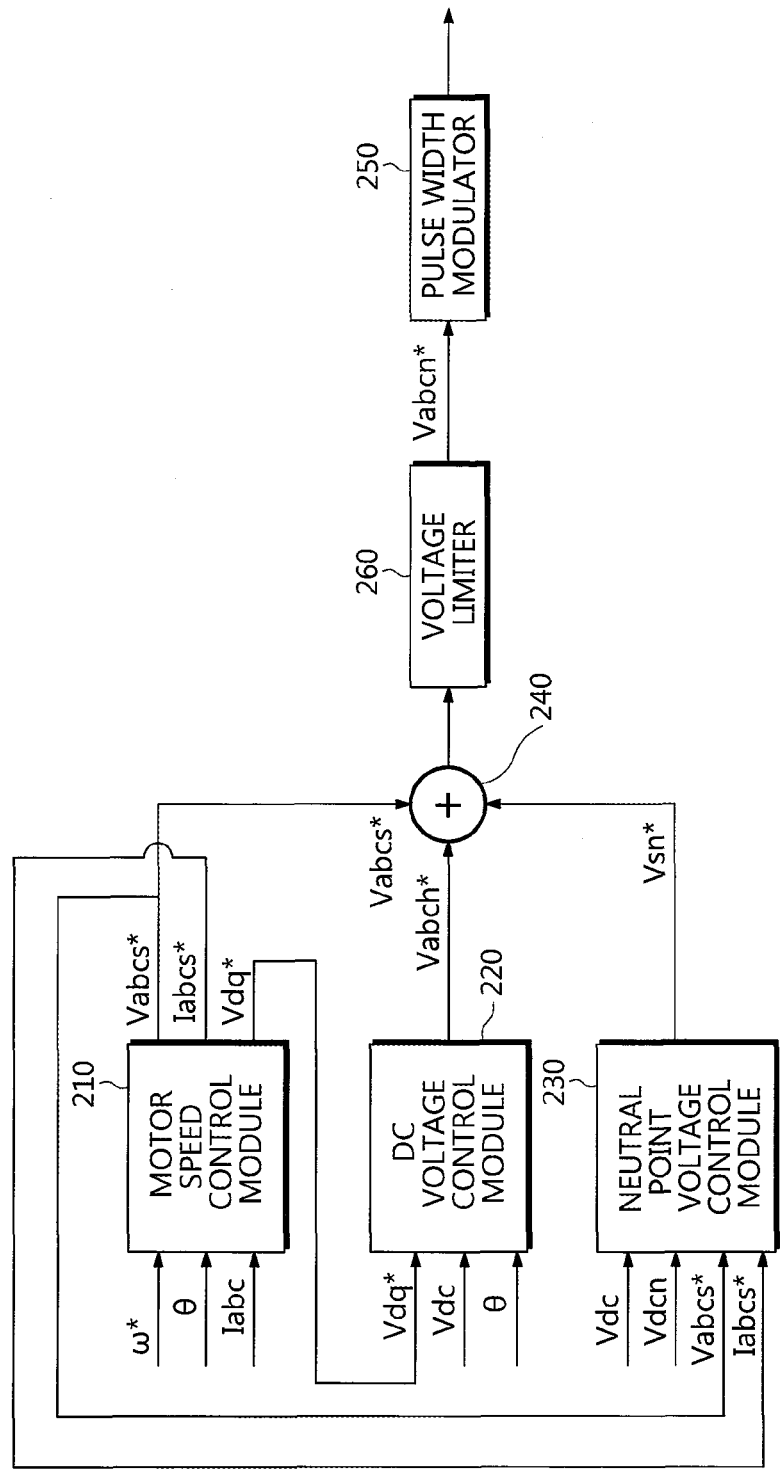
FIG. 13 illustrates a software configuration of the control module included in the motor driving apparatus according to an embodiment.

FIG. 12 illustrates a hardware configuration of a control module included in the motor driving apparatus according to an embodiment, and FIG. 13 illustrates a software configuration of the control module included in the motor driving apparatus according to an embodiment.

First, referring to FIG. 12, the control module 200 includes an analog-digital convertor (ADC) 205 to convert a driving current value detected by the current detection unit 120 and a DC voltage value detected by the voltage detection unit 130 into digital signals, a memory 203 to store programs and data for controlling the 3-level inverter 110, and a processor 201 to generate a control signal to control the 3-level inverter 110 according to the driving current value and the DC voltage value.

The ADC 205 converts the driving current value and the DC voltage value, which are analog signals, into digital signals that may be recognized by the processor 201.

The current detection unit 120 described above outputs an electrical signal of a level corresponding to the driving current value, and the voltage detection unit 130 also outputs an electrical signal of a level corresponding to the DC voltage value. The electrical signals output by the current detection unit 120 and the voltage detection unit 130 correspond to analog signals, and the processor 201 cannot process the analog signals.

Due to this reason, the control module 200 may include the ADC 205 to convert the electrical signals output by the current detection unit 120 and the voltage detection unit 130 into digital signals.

The memory 203 may store control programs and control data for controlling an operation of the motor driving apparatus 1, or memorize the control signal output by the processor 201, the driving current value detected by the current detection unit 120, the DC voltage value detected by the voltage detection unit 130, and the like.

The memory 203 may include a volatile memory such as a static random access memory (S-RAM) and a dynamic RAM (D-RAM), and a nonvolatile memory such as a flash memory, a read-only memory (ROM), an erasable programmable ROM (EPROM), and an electrically erasable programmable ROM (EEPROM).

The nonvolatile memory may operate as an auxiliary memory device of the volatile memory, and store the control programs and the control data for controlling the operation of the motor driving apparatus 1. Also, the data stored in the nonvolatile memory is not lost even when a power of the motor driving apparatus 1 is turned off.

The volatile memory may load the control programs and the control data from the nonvolatile memory, or recall the control signal output by the processor 201, the driving current value detected by the current detection unit 120, and the DC voltage value detected by the voltage detection unit 130. Unlike the nonvolatile memory, the data recalled in the volatile memory is lost when the motor driving apparatus 1 is turned off.

The processor 201 generates the control signal for controlling the 3-level inverter 110 according to the driving current value detected by the current detection unit 120, the DC voltage value detected by the voltage detection unit 130, and the programs and data stored in the memory 203.

Specifically, the processor 201 processes the driving current value detected by the current detection unit 120 and the DC voltage value detected by the voltage detection unit 130, and generates a control signal to control the 3-level inverter 110 such that the motor MO rotates at a target speed and the DC voltage and the neutral point voltage Vdcn are stabilized.

As described above, the control module 200 includes the ADC 205, the memory 203, and the processor 201 in terms of hardware.

In addition, the control module 200 may include various software modules in terms of software. As described above, the processor 201 may perform various processing functions for controlling the motor driving apparatus 1.

In addition, the control module 200 may be classified into a plurality of software modules in accordance with the various processing functions performed by the processor 201.

Specifically, as illustrated in FIG. 13, the control module 200 may include a motor speed control module 210 to control a rotation speed of the motor MO, a DC voltage control module 220 to stabilize the DC voltage Vdc, a neutral point voltage control module 230 to stabilize the neutral point voltage Vdcn, an adder 240 to synthesize outputs of the motor speed control module 210, the DC voltage control module 220, and the neutral point voltage control module 230, a voltage limiter 260 to limit an output of the adder 240, and a pulse width modulator 250 to modulate a pulse width of the output of the voltage limiter 260.

The motor speed control module 210 receives a speed reference ω* from an external device, receives a rotational displacement θ from the motor MO, receives a driving current Iabc from the current detection unit 120, and outputs a first voltage reference Vabcs*, a dq-axis voltage reference Vdq*, and a current reference Iabcs* for rotating the motor MO at a rotation speed corresponding to the speed reference ω*.

Here, the speed reference ω* may be received from an external device which includes the motor driving apparatus 1. For example, when the motor MO and the motor driving apparatus 1 are included in an air conditioner (not shown), a control apparatus (not shown) of the air conditioner may provide the speed reference ω* to the motor driving apparatus 1 such that the motor MO rotates at a target speed. In other words, the motor speed control module 210 may receive the speed reference ω* from products (e.g. an air conditioner, a refrigerator, and a vehicle) which include the motor driving apparatus 1.

In addition, the DC voltage control module 220 receives a dq-axis voltage reference Vdq* from the motor speed control module 210, receives the DC voltage Vdc from the voltage detection unit 130, receives the rotational displacement θ from the motor MO, and outputs a second voltage reference Vabch* for stabilizing the DC voltage Vdc.

Here, the dq-axis voltage reference Vdq* is generated in a calculation process for the motor speed control module 210 to control the speed of the motor MO. The dq-axis voltage reference Vdq* will be described in detail below together with the motor speed control module 210.

In addition, the neutral point voltage control module 230 receives the first voltage reference Vabcs* from the motor speed control module 210, receives the DC voltage Vdc and the neutral point voltage Vdcn from the current detection unit 120, receives the current reference Iabcs* from the motor speed control module 210, and outputs a third voltage reference Vsn* for stabilizing the neutral point voltage Vdcn.

The adder 240 synthesizes the first voltage reference Vabcs* output by the motor speed control module 210, the second voltage reference Vabch* output by the DC voltage control module 220, and the third voltage reference Vsn* output by the neutral point voltage control module 230, and outputs a synthesized fourth voltage reference Vabcn*.

Here, the first voltage reference Vabcs* and the second voltage reference Vabch* are a-phase voltages, b-phase voltages, and c-phase voltages applied to the U-phase terminal U, the V-phase terminal V, and the W-phase terminal W of the motor MO, and the third voltage reference Vsn* is one voltage value.

Consequently, the adder 240 respectively adds the a-phase voltage, the b-phase voltage, and the c-phase voltage of the first voltage reference Vabcs* to the a-phase voltage, the b-phase voltage, and the c-phase voltage of the second voltage reference Vabch*, and adds the third voltage reference Vsn* to each of the sums of the first voltage reference Vabcs* and the second voltage reference Vabch*. In other words, the a-phase voltage of the first voltage reference Vabcs*, the a-phase voltage of the second voltage reference Vabch*, and the third voltage reference Vsn* are added, the b-phase voltage of the first voltage reference Vabcs*, the b-phase voltage of the second voltage reference Vabch*, and the third voltage reference Vsn* are added, and the c-phase voltage of the first voltage reference Vabcs*, the c-phase voltage of the second voltage reference Vabch*, and the third voltage reference Vsn* are added.

The voltage limiter 260 limits the fourth voltage reference Vabcn* output by the adder 240 up to the DC voltage Vdc.

The DC-AC conversion unit 100 supplies the AC power to the motor MO using the DC power supplied from the DC link unit 6. Consequently, the AC power supplied to the motor MO by the DC-AC conversion unit 100 is limited by the DC power supplied from the DC link unit 6. Specifically, the driving voltage supplied to the motor MO by the DC-AC conversion unit 100 cannot be higher than the DC voltage Vdc applied from the DC link unit 6.

Consequently, the voltage limiter 260 limits the fourth voltage reference Vabcn* up to the DC voltage Vdc. For example, the voltage limiter 260 outputs the fourth voltage reference Vabcn* when the fourth voltage reference Vabcn* is equal to or lower than the DC voltage Vdc, and the voltage limiter 260 outputs the DC voltage Vdc when the fourth voltage reference Vabcn* is higher than the DC voltage Vdc.

The pulse width modulator 250 generates the control signal to be provided to the driving circuit 140 according to the output of the voltage limiter 260. Specifically, the pulse width modulator 250 outputs the control signal by modulating pulse widths of the a-phase, b-phase, and c-phase voltages of the output of the voltage limiter 260.

The operations of the motor speed control module 210, the DC voltage control module 220, and the neutral point voltage control module 230 will be described in more detail below.

First, the motor speed control module 210 will be described.

Figure 14:
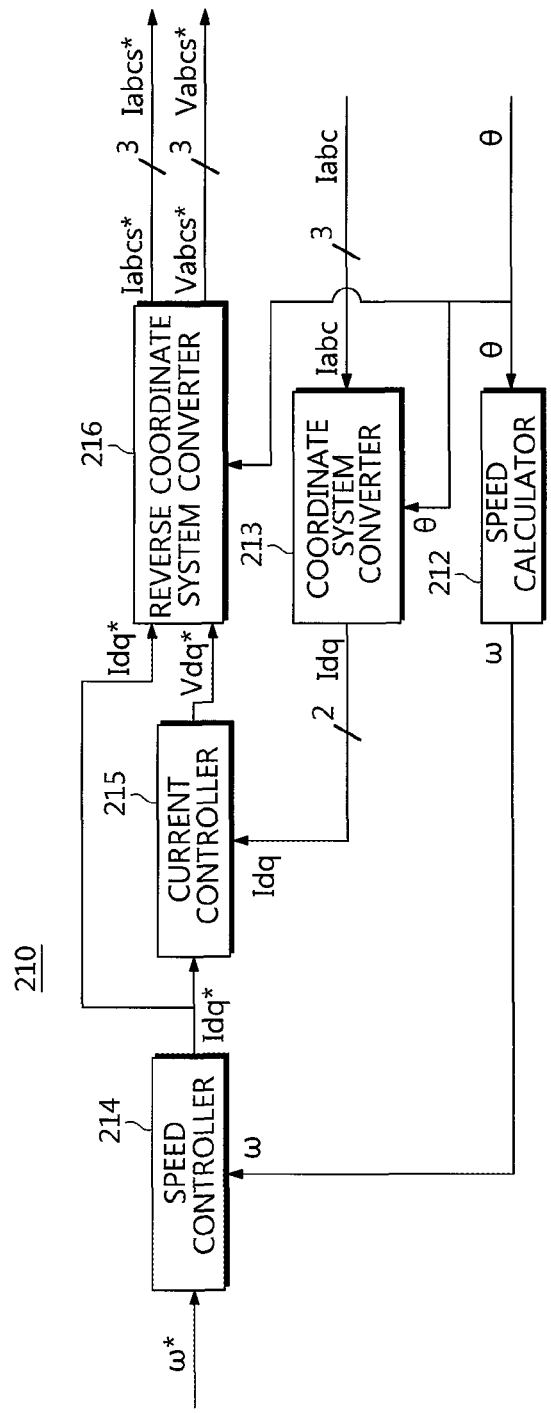
FIG. 14 illustrates a configuration of a motor speed control module included in the motor driving apparatus according to an embodiment.

FIG. 14 illustrates a configuration of a motor speed control module included in the motor driving apparatus according to an embodiment.

Referring to FIG. 14, the motor speed control module 210 may include a speed calculator 212, a coordinate system converter 213, a speed controller 214, a current controller 215, and a reverse coordinate system converter 216.

The speed calculator 212 calculates a rotation speed ω of the motor MO from the rotational displacement θ of a rotor included in the motor MO. Here, as described above, the rotational displacement θ of the rotor may be received from a rotational displacement detection sensor such as the Hall sensor, the encoder, and the resolver included in the motor MO.

Furthermore, when the motor MO does not include the rotational displacement detection sensor, the speed calculator 212 may calculate the rotation speed ω of the motor MO from the driving current Iabc detected by the current detection unit 120. The calculating of the rotation speed of the motor MO using the driving current Iabc is referred to as 'sensor-less control.'

Specifically, the speed calculator 212 may calculate the rotation speed ω of the motor MO by differentiating the rotational displacement θ of the rotor with respect to time. For example, when the speed calculator 212 receives the rotational displacement θ of the rotor every predetermined sampling period, the speed calculator 212 may calculate the rotation speed ω of the motor MO by dividing a difference between the rotational displacement θ of the rotor input in a preceding sampling time and the currently input rotational displacement θ of the rotor by the sampling period.

The coordinate system converter 213 converts the three-phase driving current Iabc into the dq-axis current Idq according to the rotational displacement θ of the rotor.

Here, the d-axis refers to an axis along a direction corresponding to a direction of a magnetic field generated by the rotor of the motor MO, and the q-axis refers to an axis along a direction that has a 90° difference from the direction of the magnetic field generated by the rotor of the motor MO. Here, 90° does not refer to a mechanical angle of the rotor, but refers to an electrical angle resulting from converting an angle between adjacent N-poles or an angle between adjacent S-poles included in the rotor in terms of 360°.

In addition, a d-axis current Id refers to a current component that generates a magnetic field along the d-axis direction of the three-phase driving current Iabc. As described above, the stator of the motor MO includes a plurality of coils, and the coils generate a magnetic field when a current is supplied to the coils. Here, a current component that generates a magnetic field along the d-axis direction of the current supplied to the coils becomes the d-axis current Id.

In addition, a q-axis current Iq refers to a current component that generates a magnetic field along the q-axis direction of the three-phase driving current Iabc. In other words, a current component that generates a magnetic field along the q-axis direction of the current supplied to the coils becomes the q-axis current Iq.

The coordinate system converter 213 may calculate the dq-axis current Idq from the three-phase driving current Iabc using [Equation 1].

$$\begin{bmatrix} I_d \\ I_q \end{bmatrix} = \begin{bmatrix} \cos\theta & \sin\theta \\ -\sin\theta & \cos\theta \end{bmatrix} \begin{bmatrix} 1 & 0 & 0 \\ 0 & \frac{1}{\sqrt{3}} & -\frac{1}{\sqrt{3}} \end{bmatrix} \begin{bmatrix} I_a \\ I_b \\ I_c \end{bmatrix} \quad \text{[Equation 1]}$$

(Here, Id represents a d-axis current, Iq represents a q-axis current, θ represents a rotational displacement of a rotor, Ia represents an a-phase current, Ib represents a b-phase current, and Ic represents a c-phase current.)

The speed controller 214 compares the speed reference ω* input from the outside with the rotation speed ω of the motor MO, and outputs the dq-axis current reference Idq* in accordance with a result of the comparison. Specifically, the speed controller 214 may output the dq-axis current to be supplied to the motor MO in order to decrease a difference between the speed reference ω* and the rotation speed ω.

The q-axis current reference Iq* is directly related to a rotary force (a torque) generated by the motor MO. In other words, the rotary force generated by the motor MO increases as the q-axis current reference Iq* increases. Also, the d-axis current reference Id* is a component that is irrelevant to the rotary force (the torque) generated by the motor MO. However, the driving voltage Vabc applied to the motor MO may be changed by the d-axis current reference Id*. The speed controller 214 may output the d-axis current reference Id* as "0" in order to decrease energy loss.

Here, a counter electromotive force increases as the rotation speed of the motor MO increases, and the driving voltage Vabc applied to the motor MO also increases as the counter electromotive force increases. Here, the driving voltage Vabc is limited by the DC voltage Vdc applied from the DC link unit 6. That is, the driving voltage Vabc cannot be higher than the DC voltage Vdc.

While the driving voltage Vabc is being limited by the DC voltage Vdc, the speed controller 214 may output a negative d-axis current reference Id* for the motor MO to generate a greater rotary force. When the speed controller 214 outputs the negative d-axis current reference Id*, the driving voltage Vabc may be decreased.

The outputting of the negative d-axis current reference Id* by the speed controller 214 in a rapid rotation range of the motor MO is generally referred to as "weak magnetic flux control."

The speed controller 214 may include at least one of a proportional controller, a proportional integral controller, and a proportional integral and differential controller.

The current controller 215 compares the dq-axis current reference Idq* output by the speed controller 214 with the dq-axis current Idq of the motor MO, and outputs the dq-axis voltage reference Vdq* in accordance with a result of the comparison. Specifically, the current controller 215 outputs the dq-axis voltage to be applied to the motor MO in order to decrease a difference between the dq-axis current reference Idq* and the dq-axis driving current Idq.

Here, the dq-axis current Idq is the dq-axis current Idq output by the coordinate system converter 213 described above. Also, the dq-axis voltage reference Vdq* refers to a voltage corresponding to the dq-axis current reference Idq*. In other words, the dq-axis voltage reference Vdq* refers to a dq-axis voltage that should be applied to the motor MO in order to supply the dq-axis current reference Idq* to the motor MO.

The current controller 215 may also include at least one of the proportional controller, the proportional integral controller, and the proportional integral and differential controller.

The reverse coordinate system converter 216 converts the dq-axis voltage reference Vdq* into the first voltage reference Vabcs* in accordance with the rotational displacement θ of the rotor.

The dq-axis voltage reference Vdq* refers to a dq-axis voltage that should be applied to the motor MO in order to supply the dq-axis current reference Idq* to the motor MO as described above.

The reverse coordinate system converter 216 may calculate the first voltage reference Vabcs* from the dq-axis voltage Vdq using [Equation 2]. Specifically, the reverse coordinate system converter 216 outputs a driving voltage that should be actually applied to the U-phase terminal U, the V-phase terminal V, and the W-phase terminal W of the motor MO for the dq-axis voltage reference Vdq* to be applied to the motor MO.

$$\begin{bmatrix} V_a \\ V_b \\ V_c \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} V_d \\ V_q \end{bmatrix} \quad \text{[Equation 2]}$$

(Here, Vd represents d-axis voltage, Vq represents q-axis voltage, θ represents a rotational displacement of a rotor, Va represents an a-phase voltage, Vb represents a b-phase voltage, and Vc represents a c-phase voltage.)

In addition, the reverse coordinate system converter 216 calculates the current reference Iabcs* from the dq-axis current Idq. Specifically, the reverse coordinate system converter 216 may calculate the current reference Iabcs* from the dq-axis Idq using a relation of [Equation 2].

As above, the motor speed control module 210 outputs the first voltage reference Vabcs* for rotating the motor MO at the speed of the speed reference ω* to the adder 240 according to the rotational displacement θ of the rotor, the driving current Iabc supplied to each of the phases of the motor MO, and the speed reference ω* input from the external device. Also, the motor speed control module 210 outputs the dq-axis voltage reference Vdq* to the DC voltage control module 220 to be described below.

Next, the DC voltage control module 220 will be described.

Figure 15:
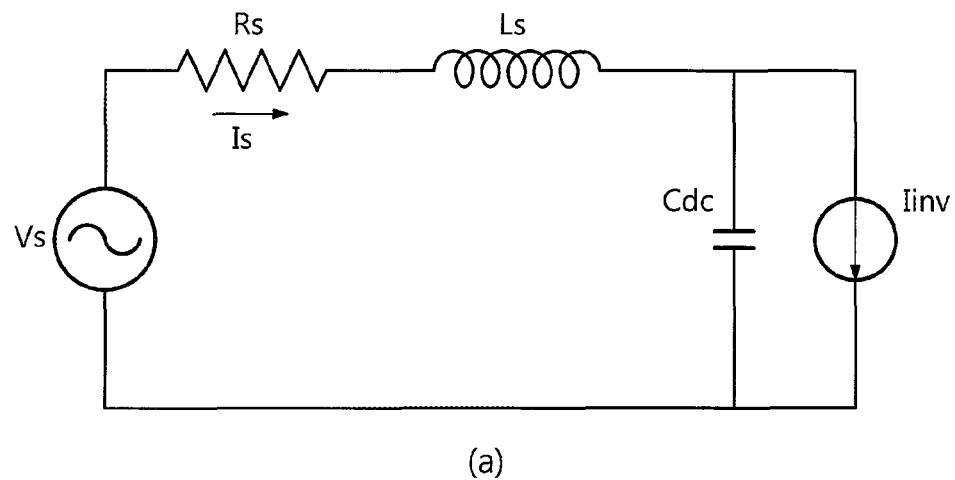
FIG. 15 is an equivalent circuit briefly modeling an external power source, the motor driving apparatus, and a motor.
Figure 15:
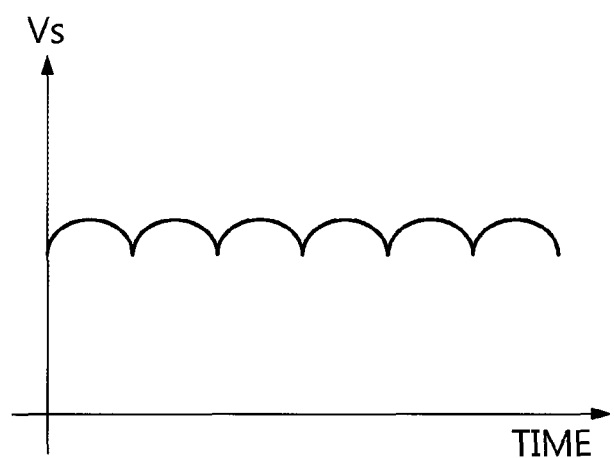
Figure 16:
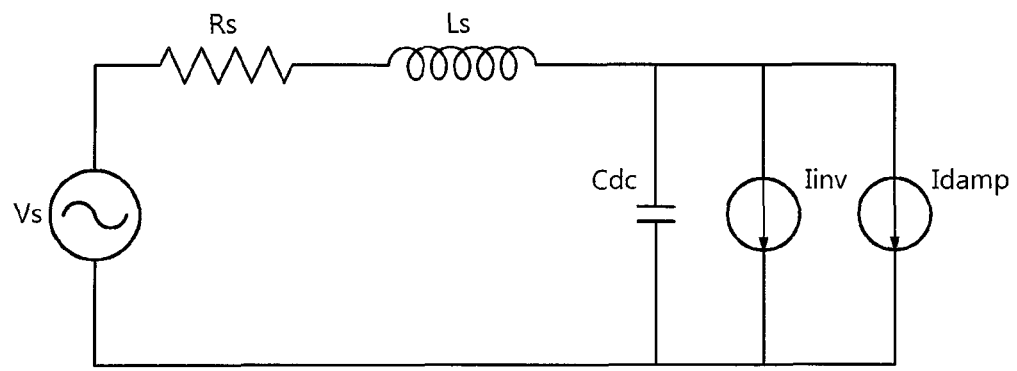
FIG. 16 is an equivalent circuit including a damping current source for preventing divergence of a DC voltage.
Figure 17:
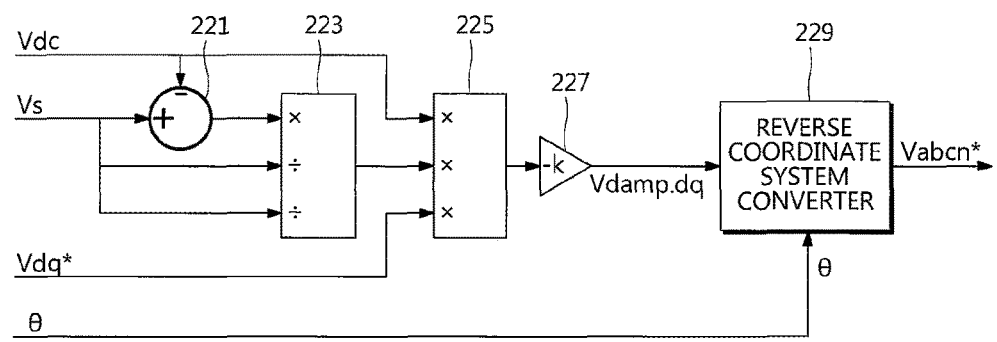
FIG. 17 illustrates a configuration of a DC voltage control module included in the motor driving apparatus according to an embodiment.

FIG. 15 is an equivalent circuit briefly modeling an external power source, the motor driving apparatus, and a motor, FIG. 16 is an equivalent circuit including a damping current source for preventing divergence of a DC voltage, and FIG. 17 illustrates a configuration of a DC voltage control module included in the motor driving apparatus according to an embodiment.

First, a change of the DC voltage Vdc will be described with reference to FIG. 15.

As illustrated in section (a) of FIG. 15, the external power source ES may be simply modeled using an equivalent voltage source Vs, an equivalent resistor Rs, and an equivalent inductor Ls, the DC link unit 6 may be simply modeled using an equivalent capacitor Cdc, and the motor MO and the DC-AC conversion unit 100 may be simply modeled using a current source Iinv.

Here, the equivalent voltage source Vs applies a voltage as illustrated in section (b) of FIG. 15 to the equivalent capacitor Cdc. Specifically, the equivalent voltage source Vs applies a voltage in a form of the three-phase AC voltage rectified by the rectifying circuit 3 to the equivalent capacitor Cdc. However, it may be impossible to measure the voltage output by the equivalent voltage source Vs using the equivalent inductor Ls and the equivalent capacitor Cdc.

Due to this reason, hereinafter, it will be assumed that the voltage output by the equivalent voltage source Vs is an average value of voltages applied from the external power source ES.

In addition, the equivalent inductor Ls represents an inductance inside the external power source ES, and the equivalent resistor Rs represents a resistance by a power line, etc.

In addition, the equivalent capacitor Cdc of the motor driving apparatus 1 represents the film capacitors C7a and C7b included in the DC link unit 6 of the motor driving apparatus 1.

As illustrated in section (a) of FIG. 15, equivalent circuits of the external power source ES, the motor driving apparatus 1, and the motor MO include the equivalent inductor Ls of the external power source ES and the equivalent capacitor Cdc of the motor driving apparatus 1. As a result, a resonance phenomenon occurs between the equivalent inductor Ls and the equivalent capacitor Cdc, and makes a voltage between both ends of the equivalent capacitor Cdc unstable.

The resonance phenomenon will be mathematically examined.

The equivalent circuit illustrated in section (a) of FIG. 15 may be expressed by [Equation 3] and [Equation 4].

$$\frac{d}{dt}V_{dc} = \frac{1}{C_{dc}}(I_s - I_{inv}) \quad \text{[Equation 3]}$$

(Here, Vdc represents the DC voltage, Cdc represents a capacitance of the equivalent capacitor, Is represents a supplied current supplied from the voltage source, and Iinv represents a driving current supplied to the motor.)

$$\frac{d}{dt}I_s = \frac{1}{L_s}(V_s - V_{dc} - R_s I_s) \quad \text{[Equation 4]}$$

(Here, Is represents a supplied current supplied from the voltage source, Ls represents an inductance of the equivalent inductor, Vs represents a voltage source voltage applied from the voltage source, Vdc represents the DC voltage, and Rs represents the resistive value of the equivalent resistor.)

In addition, when the DC voltage Vdc changes, a small signal analysis may be performed in order to analyze the stability of the voltage.

A small signal analysis of the circuit in section (a) of FIG. 15 is shown in [Equation 5].

$$I_{inv} = P_{inv}/V_{dc} \quad \text{[Equation 5]}$$
$$= P_{inv}/V_{dc(0)} + P_{inv}/V_{dc}(0)^2(V_{dc}(0) - V_{dc})$$
$$= I_{inv}(0) + \Delta V_{dc}/R_{inv}$$
$$= 2I_{inv}(0) - V_{dc}/R_{inv}$$

(Here, Iinv represents an equivalent driving current supplied to the motor, Pinv represents a consumed power of the motor, Vdc represents a DC voltage including a ripple, Vdc(0) represents a DC component of the DC voltage, Rinv represents the equivalent resistor of the motor, and Iinv(0) represents a driving current caused by the DC component of the DC voltage.)

A result of substituting [Equation 5] into [Equation 3] is shown in [Equation 6].

$$\frac{d}{dt}V_{dc} = 1/C_{dc}(I_s - I_{inv}) \quad \text{[Equation 6]}$$
$$= 1/C_{dc}(I_s - P_{inv}/V_{dc}(0) + P_{inv}/V_{dc}(0)^2(V_{dc}(0) - V_{dc}))$$

(Here, Vdc represents an equivalent driving DC voltage including a ripple, Cdc represents a capacitance of the equivalent capacitor, Is represents a current supplied from the equivalent voltage source, Iinv represents a driving current supplied to the motor, and Rinv represents the equivalent resistor of the motor.)

A value of the differential equation shown in [Equation 6] has a form of an exponential function such that the DC voltage Vdc gradually increases as time passes. That is, the DC voltage Vdc diverges instead of being stabilized.

To prevent the divergence of the DC voltage Vdc, a damping current source Idamp may be provided as illustrated in FIG. 16.

To prevent the divergence of the DC voltage Vdc according to [Equation 6], a damping current of the damping current source Idamp may be set as in [Equation 7].

$$I_{damp} = -k\frac{P_{inv}}{V_{dc}(0)^2}(V_{dc}(0) - V_{dc}) \quad \text{[Equation 7]}$$

(Here, Idamp represents a damping current of the damping current source, k represents any constant greater than 1, Pinv represents the consumed power of the motor, Vdc represents the DC voltage including a ripple, and Vdc(0) represents a DC component of the DC voltage.)

A small signal analysis of the circuit of FIG. 16 is shown in [Equation 8].

$$I_{inv} = P_{inv}/V_{dc} + I_{damp} \quad \text{[Equation 8]}$$
$$= P_{inv}/V_{dc}(0) + P_{inv/V_{dc}}(0)^2(V_{dc}(0) - V_{dc}) -$$
$$k\frac{P_{inv}}{V_{dc}(0)^2}(V_{dc}(0) - V_{dc})$$
$$= I_{inv}(0) + (1-k)\Delta V_{dc}/R_{inv}$$
$$= (2-k)I_{inv}(0) + (-1+k)V_{dc}/R_{inv}$$

(Here, Iinv represents an equivalent driving current supplied to the motor, Pinv represents a consumed power of the motor, Vdc represents the DC voltage including a ripple, Vdc(0) represents a DC component of the DC voltage, k represents any constant greater than 1, Rinv represents the equivalent resistor of the motor, and Iinv(0) represents a driving current caused by the DC component of the DC voltage.)

A result of substituting [Equation 8] into [Equation 3] is shown in [Equation 9].

$$\frac{d}{dt}V_{dc} = 1/C_{dc}(I_s - I_{inv}) \quad \text{[Equation 9]}$$
$$= 1/C_{dc}[I_s - (2-k)I_{inv}(0) - (-1+k)V_{dc}/R_{inv}]$$

(Here, Vdc represents the DC voltage including a ripple, Cdc represents the capacitance of the equivalent capacitor, Is represents a current supplied from the voltage source, Iinv represents a driving current supplied to the motor, Rinv represents the equivalent resistor of the motor, K represents any constant greater than 1, and Iinv(0) represents a driving current caused by the DC component of the DC voltage.)

According to [Equation 9], the DC voltage Vdc does not diverge and converges at a certain value when the value of k is greater than 1. Also, as the constant k increases in value, the more the DC voltage Vdc is stabilized.

The DC voltage control module 220 may output the voltage reference Vabch* corresponding to the damping current Idamp in order to stabilize the DC voltage Vdc.

The damping voltage Vdamp corresponding to the damping current Idamp may be calculated using [Equation 7], [Equation 10], and [Equation 11].

$$\frac{3}{2}(V_{damp,d}I_d + V_{damp,q}I_q) = V_{dc}I_{damp} \qquad \text{[Equation 10]}$$

(Here, Vdamp,d represents a d-axis damping voltage reference, Id represents a d-axis current reference, Vdamp,q represents a q-axis damping voltage reference, and Iq represents a q-axis current reference.)

$$P_{inv} = V_{dc}I_{inv} = \frac{3}{2}(V_d I_d + V_q I_q) \qquad \text{[Equation 11]}$$

(Here, Pinv represents a consumed power of the motor, Vdc represents the DC voltage, Iinv represents a driving current supplied to the motor, Id represents a d-axis current reference, Iq represents a q-axis current reference, Vd represents a d-axis voltage reference, and Vq represents a q-axis voltage reference.)

When [Equation 10] is simplified, and [Equation 7] and [Equation 11] are substituted thereinto, the result is shown in [Equation 12].

$$\begin{aligned} V_{damp,dq} &= \frac{2}{3}\frac{V_{dc}I_{damp}}{I_{dq}} \\ &= -k\frac{V_{dc}V_{dq}}{V_{dc}(0)^2}(V_{dc}(0) - V_{dc}) \\ &= -k\frac{V_{dc}V_{dq}}{V_s^2}(V_s - V_{dc}) \end{aligned} \qquad \text{[Equation 12]}$$

(Here, Vdamp,dq represents a dq-axis damping voltage reference, Idq represents a dq-axis current reference, Vdc represents the DC voltage, Vdc(0) represents a DC component of the DC voltage, Vs represents a voltage of the voltage source, and k represents any constant greater than 1.)

According to [Equation 12], an output voltage of the equivalent voltage source Vs should be calculated in order to calculate the dq-axis damping voltage reference Vdamp,dq.

The voltage of the equivalent voltage source Vs may be calculated from [Equation 3] and [Equation 4]. In other words, the output voltage of the equivalent voltage source Vs may be estimated using the equivalent driving current Iinv and the DC voltage Vdc supplied to the motor MO. Furthermore, the voltage of the equivalent voltage source Vs may be given by a designer in accordance with an output voltage of the external power source ES and a rated current of the motor MO. For example, the voltage of the equivalent voltage source Vs may be set as an average value of the voltages applied from the external power source ES. Hereinafter, the voltage of the equivalent voltage source Vs is assumed as the average value of the voltages applied from the external power source ES to assist in understanding the disclosure.

In addition, when the dq-axis damping voltage reference Vdamp,dq is converted to reverse coordinates, the second voltage reference Vabch* is calculated. In other words, when the dq-axis damping voltage reference Vdamp,dq of the dq-axis coordinate system is converted to abc phases, the second voltage reference Vabch* is acquired.

Based on the theories described above, the DC voltage control module 220 may calculate the dq-axis damping voltage reference Vdamp,dq using [Equation 12], and may calculate the second voltage reference Vabch* from the dq-axis damping voltage reference Vdamp,dq.

Specifically, the DC voltage control module 220 may include a subtractor 221, a divider 223, a multiplier 225, an amplifier 227, and a reverse coordinate system converter 229 as illustrated in FIG. 17.

The subtractor 221 calculates a difference between the voltage source voltage Vs and the DC voltage Vdc, and the divider 223 calculates a value resulting from dividing the difference between the voltage source voltage Vs and the DC voltage Vdc by a square of the voltage source voltage Vs. Also, the multiplier 225 calculates a product of an output of the divider 223, the DC voltage Vdc, and the dq-axis voltage reference Vdq, and the amplifier 227 amplifies the output of the multiplier 225 by '−k' times.

[Equation 12] is realized by the subtractor 221, the divider 223, the multiplier 225, and the amplifier 227. As a result, an output of the amplifier 227 is the same as the dq-axis damping voltage reference Vdamp,dq.

The reverse coordinate system converter 229 converts the dq-axis damping voltage reference Vdamp,dq into the second voltage reference Vabch* in accordance with the rotational displacement θ of the rotor.

As described above, the DC voltage control module 220 may calculate the damping voltage Vdamp,dq that stabilizes the DC voltage Vdc, i.e. the second voltage reference Vabch*.

Next, the neutral point voltage control module 230 will be described.

Figure 18:
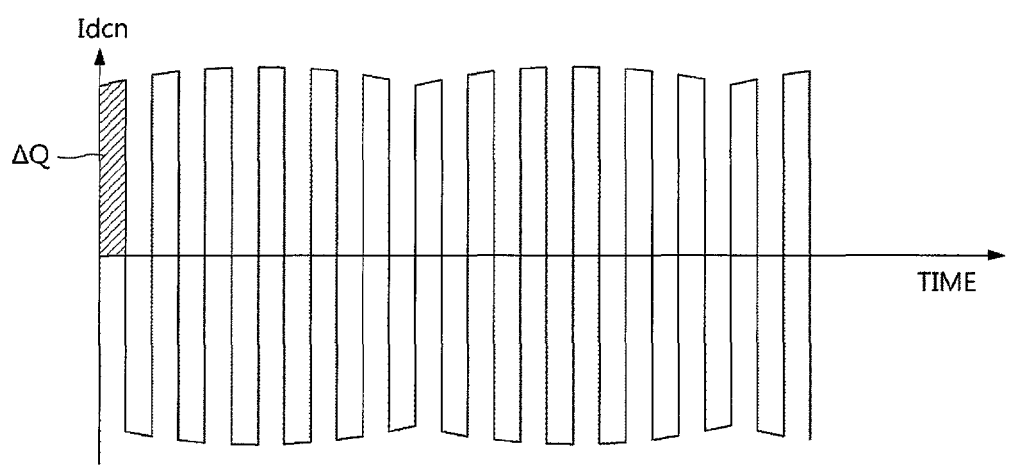
FIG. 18 illustrates a current flowing in a neutral point of the DC link unit included in the motor driving apparatus according to an embodiment.
Figure 19:
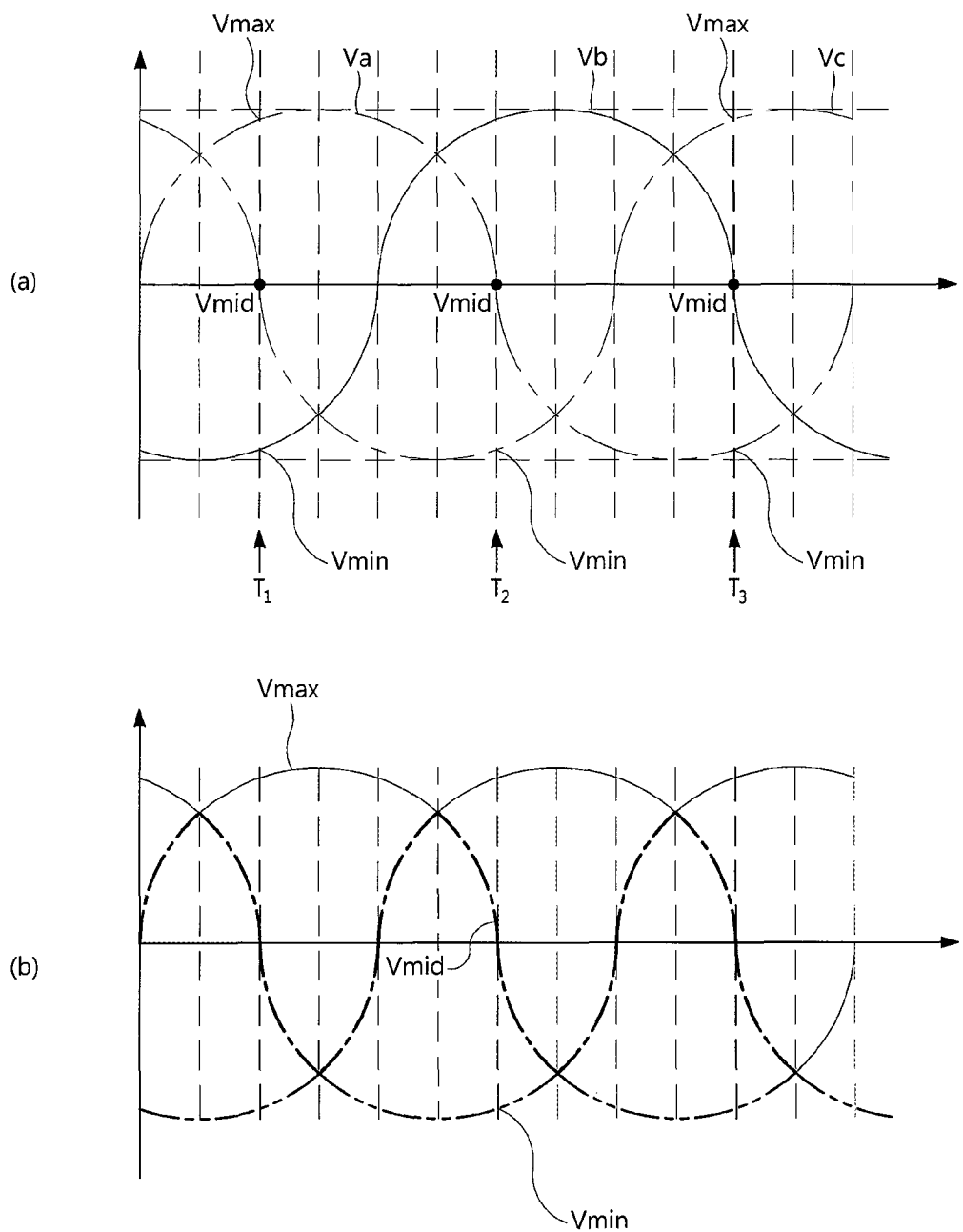
FIG. 19 illustrates a phase voltage output by the motor driving apparatus according to an embodiment.
Figure 20:
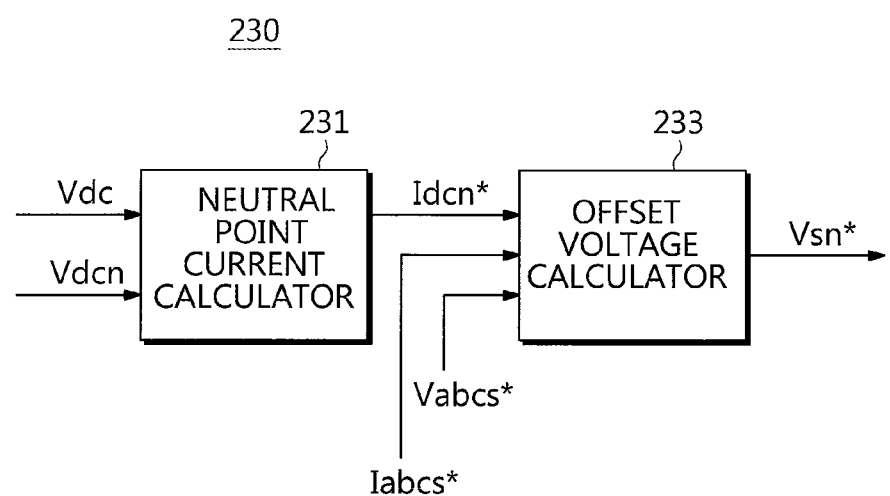
FIG. 20 illustrates a configuration of a neutral point voltage control module included in the motor driving apparatus according to an embodiment.

FIG. 18 illustrates a current flowing in a neutral point of the DC link unit included in the motor driving apparatus according to an embodiment, and FIG. 19 illustrates a phase voltage output by the motor driving apparatus according to an embodiment. Also, FIG. 20 illustrates a configuration of a neutral point voltage control module included in the motor driving apparatus according to an embodiment.

As described above, the current flows to the neutral terminal C of the DC link unit 6 or flows out from the neutral terminal C of the DC link unit 6 in accordance with an operation of the 3-level inverter 110.

For example, when the first upper switching element Q11 and the second left switching element Q24 of the 3-level inverter 110 are closed, the driving current may flow to the motor MO from the positive DC terminal P via the first upper switching element Q11 and the U-phase terminal U, and flow to the neutral terminal C from the motor MO via the V-phase terminal V and the second left switching element Q24.

In another example, when the first right switching element Q13 and the second lower switching element Q22 of the 3-level inverter 110 are closed, the driving current may flow to the motor MO from the neutral terminal C via the first right switching element Q13 and the U-phase terminal U, and flow to the negative DC terminal N from the motor MO via the V-phase terminal V and the second lower switching element Q22.

Specifically, the current flowing to the neutral terminal C has a stepped wave form as illustrated in FIG. 18. In other words, the current periodically flows into and flows out of the neutral terminal C in order to drive the motor MO.

Since the upper capacitor C7a and the lower capacitor C7b are connected via the neutral terminal C, a charge amount stored in the upper capacitor C7a and the lower capacitor C7b changes, and a voltage between both ends of the upper capacitor C7a and a voltage between both ends of the lower capacitor C7b also change in accordance with the current flowing to the neutral terminal C.

For example, when the current flows to the neutral terminal C from the positive DC terminal P via the motor MO, the charge amount stored in the upper capacitor C7a decreases, and the charge amount stored in the lower capacitor C7b increases. In other words, when the neutral point current Idcn flowing to the neutral terminal C increases, a difference ΔQ of the charge amounts is generated between the upper capacitor C7a and the lower capacitor C7b as illustrated in FIG. 18. The charge amount stored in the lower capacitor C7b becomes ΔQ greater than the charge amount stored in the upper capacitor C7a.

The difference ΔQ of the charge amounts causes a difference ΔVdc between the voltage between both ends of the upper capacitor C7a and the voltage between both ends of the lower capacitor C7b. In other words, a voltage VdcL between both ends of the lower capacitor C7b becomes ΔVdc greater than a voltage VdcH between both ends of the upper capacitor C7a.

In addition, when the current flows to the negative DC terminal N from the neutral terminal C via the motor MO, a phenomenon opposite from that described above occurs. In other words, when the neutral point current Idcn flowing to the neutral terminal C increases in a negative direction, the charge amount stored in the upper capacitor C7a becomes ΔQ greater than the charge amount stored in the lower capacitor C7b. Also, the voltage VdcH between both ends of the upper capacitor C7a becomes ΔVdc greater than the voltage VdcL between both ends of the lower capacitor C7b.

As above, the neutral point voltage Vdcn is not stabilized and vibrates due to the neutral point current Idcn.

Particularly, when a low-capacity film capacitor is used as the upper capacitor C7a and the lower capacitor C7b, an amplitude of a vibration of the neutral point voltage Vdcn caused by the neutral point current Idcn may further increase.

As a result, not only it is difficult to stably control the rotation speed of the motor MO, but the switching elements Q11 to Q14, Q21 to Q24, and Q31 to Q34 included in the 3-level inverter 110 may be damaged.

The vibration of the neutral point vibration Vdcn will be examined.

A change of the neutral point voltage Vdcn caused by the neutral point current Idcn may be expressed by [Equation 13].

$$\Delta V_{dcH} = \frac{1}{C_{dc}} \int_0^t I_{dcH}\, dt \qquad \text{[Equation 13]}$$

$$\Delta V_{dcL} = \frac{1}{C_{dc}} \int_0^t I_{dcL}\, dt$$

$$\Delta V_{dcn} = (\Delta V_{dcH} - \Delta V_{dcL}) = \frac{1}{C_{dc}} \int_0^t (I_{dcH} - I_{dcL})\, dt = \frac{1}{C_{dc}} \int_0^t I_{dcn}\, dt$$

(Here, ΔVdcH represents a change in a voltage of the upper capacitor, Cdc represents capacitances of the upper and lower capacitors, IdcH represents a current flowing to the upper capacitor, ΔVdcL represents a change in a voltage of the lower capacitor, IdcL represents a current flowing to the lower capacitor, ΔVdcn represents a change in a neutral point voltage, and Idcn represents a neutral point current.)

According to [Equation 13], a change ΔVdcn in the neutral point voltage is determined by the neutral point current Idcn.

In addition, the neutral point current Idcn during on/off periods of the neutral point switching elements Q14, Q13, Q24, Q23, Q34, and Q33 included in the 3-level inverter 110 may be expressed by [Equation 14].

$$I_{dcn} = \sum_{x=a,b,c} T_{xn}/T_{sw} I_x \qquad \text{[Equation 14]}$$

(Here, Idcn represents the neutral point current, Txn represents an on-time of the neutral point switch, Tsw represents an on/off period of a switch, and Ix represents a phase current.)

When the neutral point voltage Vdcn is maintained as half of the DC voltage Vdc, [Equation 14] may be expressed as [Equation 15].

$$I_{dcn} = \sum_{x=a,b,c}\left[1 - \left|\frac{V_x}{V_{dc}/2}\right|\right] I_x = \qquad \text{[Equation 15]}$$

$$-\sum_{x=a,b,c}\left|\frac{V_x}{V_{dc}/2}\right| I_x = -\sum_{x=a,b,c} |V_{x,norm}| I_x$$

(Here, Idcn represents the neutral point current, Vx represents a phase voltage, Ix represents the phase current, Vdc represents the DC voltage, and Vx,norm represents a normalized phase voltage.)

According to [Equation 15], the neutral point current Idcn is determined by the phase voltages Va, Vb, and Vc and the phase currents Ia, Ib, and Ic. Also, the normalized phase voltage Vx,norm in [Equation 15] may have a value between −1 and +1. The normalized phase voltage Vx,norm represents a ratio of the phase voltages Va, Vb, and Vc with respect to half of the DC voltage Vdc.

Here, the phase currents Ia, Ib, and Ic are important factors related to the torque of the motor MO, and are controlled by the motor speed control module 210 described above. Consequently, it is difficult for the neutral point voltage control module 230 to control the phase currents Ia, Ib, and Ic.

The phase voltages Va, Vb, and Vc are related to the phase currents Ia, Ib, and Ic. Specifically, the phase currents Ia, Ib, and Ic change due to differences among the phase voltages Va, Vb, and Vc.

When the phase voltages Va, Vb, and Vc are changed while constantly maintaining the differences among the phase voltages Va, Vb, and Vc, the phase currents Ia, Ib, and Ic are not changed. In other words, when all of the phase voltages Va, Vb, and Bc change by the same level, the phase currents Ia, Ib, and Ic may not be changed.

Due to this reason, the phase voltages Va, Vb, and Vc may be changed by adding a offset voltage (zero sequence voltage) Voffset to all of the phase voltages Va, Vb, and Vc, and here, the phase currents Ia, Ib, and Ic are not changed.

Consequently, when the offset voltage Voffset is added to all of the phase voltages Va, Vb, and Vc and the offset voltage Voffset is controlled, the neutral point current Idcn and the neutral point voltage Vdcn may be controlled.

As described above, according to [Equation 15], the neutral point current Idcn is determined by multiplication between the phase voltages Va, Vb, and Vc and the phase currents Ia, Ib, and Ic.

In addition, the phase voltages Va, Vb, and Vc and the phase currents Ia, Ib, and Ic have a sine wave form. Here, a maximum voltage Vmax, a middle voltage Vmid, and a minimum voltage Vmin may be set at each of sampling times T1, T2, and T3.

For example, as illustrated in section (a) of FIG. 19, the a-phase voltage Va becomes the maximum voltage Vmax, the c-phase voltage Vc becomes the middle voltage Vmid, and the b-phase voltage Vb becomes the minimum voltage Vmin at the first sampling time T1. Also, the b-phase voltage Vb becomes the maximum voltage Vmax, the a-phase voltage Va becomes the middle voltage Vmid, and the c-phase voltage Vc becomes the minimum voltage Vmin at the second sampling time T2. Also, the c-phase voltage Vc becomes the maximum voltage Vmax, the b-phase voltage Vb becomes the middle voltage Vmid, and the a-phase voltage Va becomes the minimum voltage Vmin at the third sampling time T3.

If the phase voltages Va, Vb, and Vc as in section (a) of FIG. 19 are output, the maximum voltage Vmax, the middle voltage Vmid, and the minimum voltage Vmin may be determined as illustrated in section (b) of FIG. 19.

In addition, a phase current of a phase the same as the maximum voltage Vmax (e.g., the a-phase at the first sampling time, the b-phase at the second sampling time, and the c-phase at the third sampling time) may be defined as a maximum current Imax, a phase current of a phase the same as the middle voltage Vmid may be defined as a middle current Imid, and a phase current of a phase the same as the minimum voltage Vmin may be defined as a minimum current Imin.

For example, the a-phase current Ia becomes the maximum current Imax, the c-phase current Ic becomes the middle current Imid, and the b-phase current Ib becomes the minimum current Imin at the first sampling time T1. Also, the b-phase current Ib becomes the maximum current Imax, the a-phase current Ia becomes the middle current Imid, and the c-phase current Ic becomes the minimum current Imin at the second sampling time T2. Also, the c-phase current Ic becomes the maximum current Imax, the b-phase current Ib becomes the middle current Imid, and the a-phase current Ia becomes the minimum current Imin at the third sampling time T3.

In other words, the maximum voltage Vmax, the middle voltage Vmid, and the minimum voltage Vmin are set in accordance with each of the levels of the phase voltages Va, Vb, and Vc, and the maximum current Imax, the middle current Imid, and the minimum current Imin may be set in accordance with the levels of the phase voltages Va, Vb, and Vc.

In addition, the neutral point current Idcn may be expressed by a sum of a multiplication between the maximum voltage Vmax and the maximum current Imax, a multiplication between the middle voltage Vmid and the middle current Imid, and a multiplication between the minimum voltage Vmin and the minimum current Imin.

Here, when the offset voltage Voffset is added to each of the phase voltages Va, Vb, and Vc, the neutral point current Idcn may vary in accordance with the level of the offset voltage Voffset.

The neutral point current Idcn will be analyzed with respect to each case in accordance with the level of the offset voltage Voffset. Hereinafter, the maximum voltage, the middle voltage, and the minimum voltage to which the offset voltage Voffset is not added will be expressed as Vmax, Vmid, and Vmin, respectively, and the maximum voltage, the middle voltage, and the minimum voltage to which the offset voltage Voffset is added will be expressed as Vmax1, Vmid1, and Vmin1, respectively.

In other words, the maximum voltage Vmax, the middle voltage Vmid, and the minimum voltage Vmin to which the offset voltage Voffset is not added and the maximum voltage Vmax1, the middle voltage Vmid1, and the minimum voltage Vmin1 to which the offset voltage Voffset is added are related as shown in [Equation 16].

$$V_{max1,mid1,min1} = V_{max,mid,min} + V_{offset}. \quad \text{[Equation 16]}$$

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, and Voffset represents the offset voltage.)

However, since there is no difference in phase currents even when the offset voltage Voffset is added, there are no changes in the maximum current Imax, the middle current Imid, and the minimum current Imin. Also, since a sum of the phase currents Ia, Ib, and Ic becomes zero, a sum of the maximum current Imax, the middle current Imid, and the minimum current Imin also becomes zero.

First, a case where −Vmin<Voffset will be described.

When −Vmin<Voffset, all of the maximum voltage Vmax1, the middle voltage Vmid1, and the minimum voltage Vmin1 to which the offset voltage Voffset is added become positive values.

As a result, the neutral point current Idcn may be expressed by [Equation 17].

$$I_{dcn} = -\sum_{x=a,b,c} |V_{x,norm}| I_x = -[V_{max1} I_{max} + V_{mid1} I_{mid} + \quad \text{[Equation 17]}$$
$$V_{min1} I_{min}]$$
$$= -[V_{max} I_{max} + V_{mid} I_{mid} + V_{min} I_{min}] - V_{offset} [I_{max} +$$
$$I_{mid} + I_{min}]$$
$$= -[V_{max} I_{max} + V_{mid} I_{mid} + V_{min} I_{min}]$$

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, Imax represents the maximum current, Imid represents the middle current, Imin represents the minimum current, and Voffset represents the offset voltage.)

When −Vmin<Voffset, according to [Equation 17], the neutral point current Idcn has a constant value regardless of the level of the offset voltage Voffset.

Next, a case where −Vmid<Voffset<−Vmin will be described.

When −Vmid<Voffset<−Vmin, the maximum voltage Vmax1 and the middle voltage Vmid1 to which the offset voltage Voffset is added become positive values and the minimum voltage Vmin1 to which the offset voltage Voffset is added becomes a negative value.

As a result, the neutral point current Idcn may be expressed by [Equation 18].

$$I_{dcn} = -\sum_{x=a,b,c} |V_{x,norm}|I_x = -[V_{max1}I_{max} + V_{mid1}I_{mid} - V_{min1}I_{min}]$$
$$= -[V_{max}I_{max} + V_{mid}I_{mid} - V_{min}I_{min}] - V_{offset}[I_{max} + I_{mid} - I_{min}]$$
$$= -[V_{max}I_{max} + V_{mid}I_{mid} - V_{min}I_{min}] + 2V_{offset}I_{min}$$

[Equation 18]

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, Imax represents the maximum current, Imid represents the middle current, Imin represents the minimum current, and Voffset represents the offset voltage.)

When −Vmid<Voffset<−Vmin, according to [Equation 18], the neutral point current Idcn linearly changes in accordance with the level of the offset voltage Voffset.

Next, a case where −Vmax<Voffset<−Vmid will be described.

When −Vmax<Voffset<−Vmid, the maximum voltage Vmax1 to which the offset voltage Voffset is added becomes a positive value, and the middle voltage Vmid1 and the minimum voltage Vmin1 to which the offset voltage Voffset is added become negative values.

As a result, the neutral point current Idcn may be expressed by [Equation 19].

$$I_{dcn} = -\sum_{x=a,b,c} |V_{x,norm}|I_x = -[V_{max1}I_{max} - V_{mid1}I_{mid} - V_{min1}I_{min}]$$
$$= -[V_{max}I_{max} - V_{mid}I_{mid} - V_{min}I_{min}] - V_{offset}[I_{max} - I_{mid} - I_{min}]$$
$$= -[V_{max}I_{max} - V_{mid}I_{mid} - V_{min}I_{min}] - 2V_{offset}I_{max}$$

[Equation 19]

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, Imax represents the maximum current, Imid represents the middle current, Imin represents the minimum current, and Voffset represents the offset voltage.)

When −Vmax<Voffset<−Vmid, according to [Equation 19], the neutral point current Idcn linearly changes in accordance with the level of the offset voltage Voffset.

Next, a case where Voffset<−Vmax will be described.

When Voffset<−Vmax, all of the maximum voltage Vmax1, the middle voltage Vmid1, and the minimum voltage Vmin1 to which the offset voltage Voffset is added become negative values.

As a result, the neutral point current Idcn may be expressed by [Equation 20].

$$I_{dcn} = -\sum_{x=a,b,c} |V_{x,norm}|I_x = -[V_{max1}I_{max} + V_{mid1}I_{mid} + V_{min1}I_{min}]$$
$$= [V_{max}I_{max} + V_{mid}I_{mid} + V_{min}I_{min}] + V_{offset}[I_{max} + I_{mid} + I_{min}]$$
$$= [V_{max}I_{max} + V_{mid}I_{mid} + V_{min}I_{min}]$$

[Equation 20]

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, Imax represents the maximum current, Imid represents the middle current, Imin represents the minimum current, and Voffset represents the offset voltage.)

When Voffset<−Vmax, according to [Equation 20], the neutral point current Idcn has a constant value regardless of the level of the offset voltage Voffset.

As described above, the neutral point current Idcn changes in accordance with the offset voltage Voffset. Consequently, the neutral point current Idcn may be calculated from the offset voltage Voffset.

Furthermore, when the neutral point current Idcn for minimizing the change in the neutral point voltage Vdcn is determined, the offset voltage Voffset may be determined according to the determined neutral point current Idcn.

In addition, the neutral point current Idcn may be calculated from the difference ΔVdcn between the voltage VdcH between both ends of the upper capacitor C7a and the voltage VdcL between both ends of the lower capacitor C7b.

Based on the theories described above, the neutral point voltage control module 230 may include a neutral point current calculator 231 and an offset voltage calculator 233 as illustrated in FIG. 20.

The neutral point current calculator 231 calculates the neutral point current Idcn from the DC voltage Vdc detected by the voltage detection unit 130 and the neutral point voltage Vdcn.

Specifically, the neutral point current calculator 231 may calculate the difference ΔVdcn between the voltage VdcH between the both ends of the upper capacitor C7a and the voltage VdcL between the both ends of the lower capacitor C7b from the DC voltage Vdc and the neutral point voltage Vdcn, and may calculate a neutral point current reference Idcn* from the difference ΔVdcn between the voltage VdcH between the both ends of the upper capacitor C7a and the voltage VdcL between the both ends of the lower capacitor C7b.

The neutral point current calculator 231 may include at least one of the proportional controller, the proportional integral controller, and the proportional integral differential controller that is input with the difference ΔVdcn between the voltage VdcH between the both ends of the upper capacitor C7a and the voltage VdcL between the both ends of the lower capacitor C7b and outputs the neutral point current reference Idcn*.

The offset voltage calculator 233 calculates the third voltage reference Vsn*, i.e., the offset voltage Voffset, from the first voltage reference Vabcs* output by the motor speed control module 210 and the neutral point current Idcn output by the neutral point current calculator 231.

Specifically, the offset voltage calculator 233 may calculate the maximum voltage Vmax, the middle voltage Vmid, the minimum voltage Vmin, the maximum current Imax, the middle current Imid, and the minimum current Imin from the first voltage reference Vabcs* and the current reference Iabcs* of the motor speed control module 210. Then, the offset voltage calculator 233 may calculate the offset voltage Voffset, i.e., the third voltage reference Vsn*, by applying the maximum voltage Vmax, the middle voltage Vmid, the minimum voltage Vmin, the maximum current Imax, the middle current Imid, and the minimum current Imin to [Equation 17] to [Equation 20].

As described above, the neutral point voltage control module 230 may calculate the offset voltage Voffset, i.e., the third voltage reference Vsn*, that stabilizes the neutral point voltage Vdcn.

The control module 200 sums the first voltage reference Vabcs* output by the motor speed control module 210, the second voltage reference Vabch* output by the DC voltage control module 220, and the third voltage reference Vsn* output by the neutral point voltage control module 230, and modulates a pulse width of a fourth voltage reference Vabsn* which is the sum.

As a result, the control module 200 may control the rotation speed of the motor MO, and provide the control signal that stabilizes the DC voltage Vdc and the neutral point voltage Vdcn to the driving circuit 140.

As described above, the motor driving apparatus 1 includes the AC-DC conversion unit 2, the DC link unit 6, and the DC-AC conversion unit 100. Also, the DC link unit 6 includes one pair of low-capacity film capacitors C7a and C7b, and the DC-AC conversion unit 100 includes the 3-level inverter 110.

When the low-capacity film capacitors C7a and C7b are used at the DC link unit 6, it is known to be difficult for the DC link unit 6 to apply a stabilized DC voltage to the DC-AC conversion unit 6. Furthermore, since the DC-AC conversion unit 100 includes the 3-level inverter 110, the DC link unit 6 has to apply not only the stabilized DC voltage but also a stabilized neutral point voltage to the DC-AC conversion unit 100.

Since the DC link unit 6 has to apply both of the stabilized DC voltage and the stabilized neutral point voltage to the DC-AC conversion unit 100, it is difficult for the motor driving apparatus 1 to control both of the DC voltage and the neutral point voltage. Due to this reason, the DC link unit 6 including the low-capacity film capacitors C7a and C7b and the DC-AC conversion unit 100 including the 3-level inverter 110 has not been attempted so far.

However, the motor driving apparatus 1 according to the embodiment of the disclosure independently performs a control of the DC voltage and a control of the neutral point voltage such that the DC link unit 6 may provide the stabilized DC voltage and the stabilized neutral point voltage to the DC-AC conversion unit 100.

The DC link unit 6 includes the low-capacity film capacitors C7a and C7b such that a durability of the motor driving apparatus 1 is improved and the entire volume of the motor driving apparatus 1 may be reduced. The low-capacity film capacitors C7a and C7b are used such that the motor driving apparatus 1 may remove an initial charging circuit for charging a high-capacity electrolytic capacitor.

In addition, the DC-AC conversion unit 100 includes the 3-level inverter 110 such that a switching loss of the DC-AC conversion unit 100 may be decreased. When the low-capacity film capacitors and a 2-level inverter are used together, the following problems may occur.

A positive feedback phenomenon may occur when a motor is driven due to the low capacity of the capacitors. The DC voltage may diverge due to the positive feedback phenomenon.

In addition, a resonance occurs between an inductance of the external power source and the capacitors due to the low capacity of the capacitors. The DC voltage varies due to the resonance phenomenon, and an electromagnetic interference, an electromagnetic susceptibility, and an electromagnetic compatibility occur.

Particularly, when the DC voltage varies within one period of a pulse width modulation, a voltage actually applied to the motor MO by the voltage reference Vabcs* becomes different from the voltage reference Vabcs*. To decrease the DC voltage being varied within one period of the pulse width modulation, a frequency of the pulse width modulation may be increased. However, in the case of the 2-level inverter, the switching loss increases due to the increase in the frequency of the pulse width modulation.

Compared to this, since the 3-level inverter has a small switching loss due to its structural characteristics, the frequency of the pulse width modulation may be sufficiently increased.

In addition, an iron loss of the motor MO may be reduced by using the 3-level inverter.

In the above, the configuration and the operation of the motor driving apparatus 1 according to the embodiment have been described.

Hereinafter, a configuration and an operation of the motor driving apparatus 1' according to another embodiment will be described.

Figure 21:
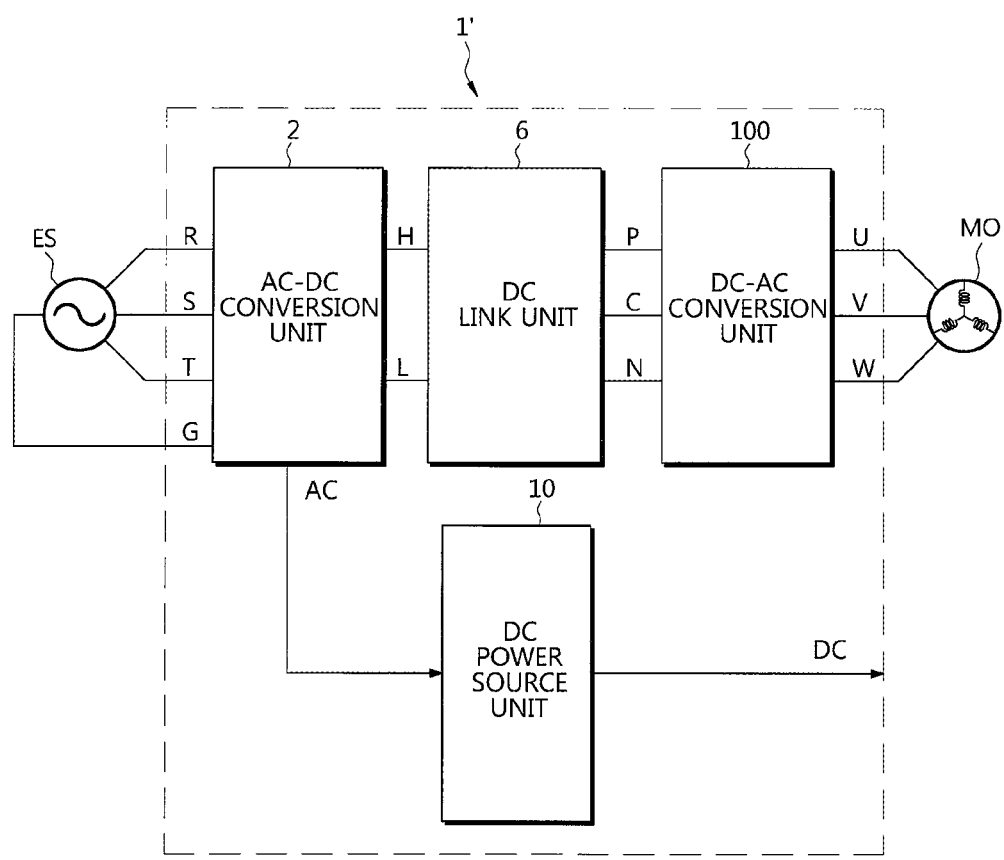
FIG. 21 illustrates a motor driving apparatus according to another embodiment.

FIG. 21 illustrates a motor driving apparatus according to another embodiment.

Referring to FIG. 21, a motor driving apparatus 1' may include an AC-DC conversion unit 2 to convert an AC voltage and an AC current applied from an external power source ES into a DC voltage and a DC current, a DC-AC conversion unit 100 to convert the converted DC voltage and the DC current into an AC voltage and an AC current having a specific frequency, a DC link unit 6 provided between the AC-DC conversion unit 2 and the DC-AC conversion unit 100 to stabilize a DC voltage Vdc output by the AC-DC conversion unit 2 to transmit the DC voltage Vdc to the DC-AC conversion unit 100, and a DC power source unit 10 to supply a low-voltage DC power to the DC-AC conversion unit 100.

The AC-DC conversion unit 2, the DC-AC conversion unit 100, and the DC link unit 6 are the same as in the motor driving apparatus 1 (refer to FIG. 1) according to the embodiment described above. Specifically, the AC-DC conversion unit 2 may include the EMI filter 4 (refer to FIG. 3), the rectifying circuit 3 (refer to FIG. 3), and the PFC 5 (refer to FIG. 3), and the DC link unit 6 (refer to FIG. 1) may include the overvoltage protection circuit 8 (refer to FIG. 5), and the smoothening circuit 7 (refer to FIG. 5). Also, the DC-AC conversion unit 100 may include a 3-level inverter 110, a current detection unit 120, a voltage detection unit 130, a driving circuit 140, and a control module 200.

The DC power source unit 10 receives an unrectified AC power from the AC-DC conversion unit 2, and supplies the low-voltage DC power to the DC-AC conversion unit 100.

As described above, the DC-AC conversion unit 100 may include the 3-level inverter 110, the current detection unit 120, the voltage detection unit 130, the driving circuit 140, and the control module 200.

The 3-level inverter 110 directly receives the DC power from the DC link unit 6. For example, when the external power source ES is a 220V single-phase AC power source, the DC link unit 6 supplies a 310V DC power to the 3-level inverter 110. Also, when the external power source ES is a 380V three-phase AC power source, the DC link unit 6 supplies a 540V DC power to the 3-level inverter 110.

Compared to this, the driving circuit 140 and the control module 200 may receive the low-voltage DC power from the DC power source unit 10. For example, the driving circuit 140 may receive a DC power of approximately 12V to 18V from the DC power source unit 10, and the control module 200 may receive a DC power of approximately 3.3V to 5V from the DC power source unit 10.

Like this, the DC power source unit 10 may supply the DC power having various voltage ranges such as 12V to 18V and 3.3V to 5V to the driving circuit 140 and the control module 200 that control and drive the 3-level inverter 110.

Hereinafter, a configuration of the DC power source unit 10 will be examined.

Figure 22:
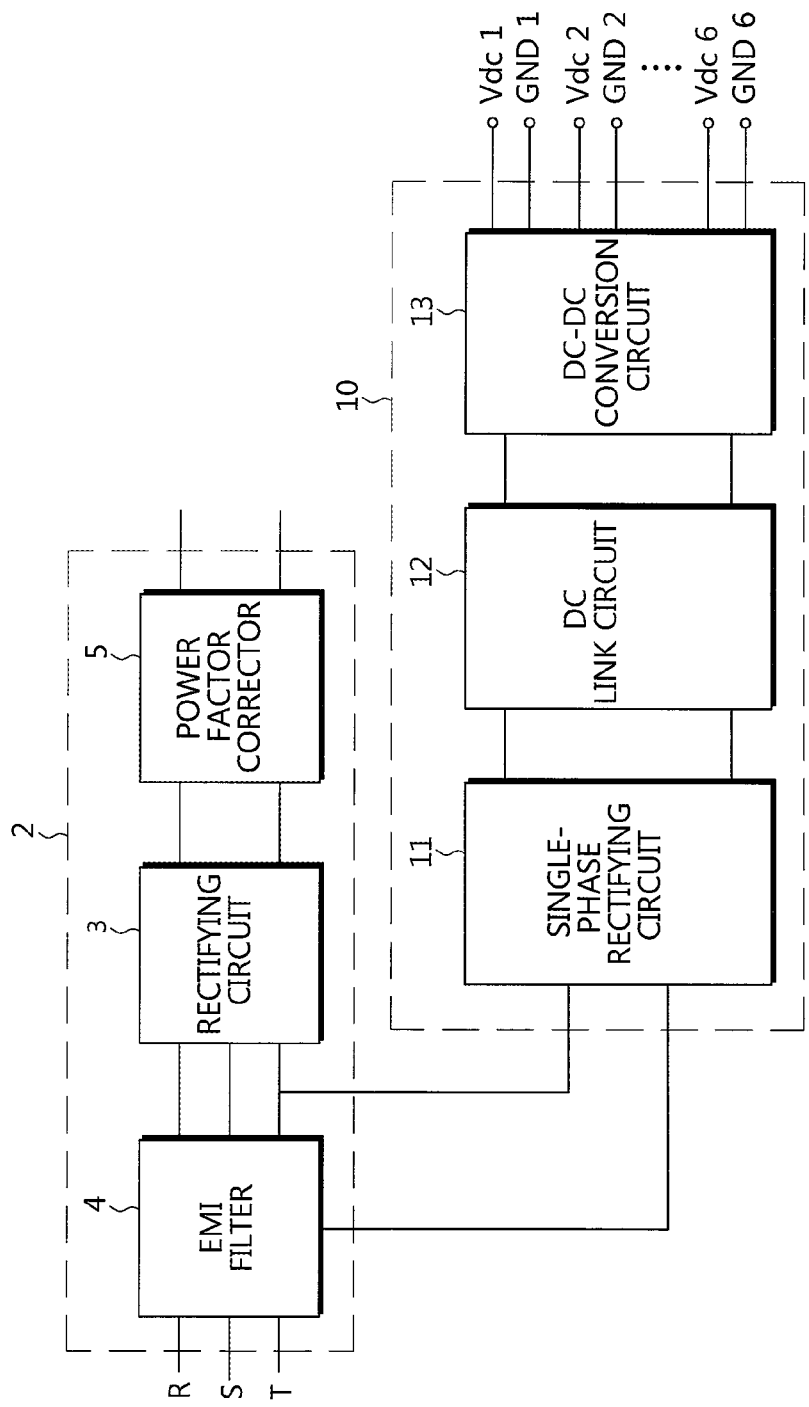
FIG. 22 illustrates a configuration of a DC power source unit of a motor driving apparatus according to another embodiment.
Figure 23A:
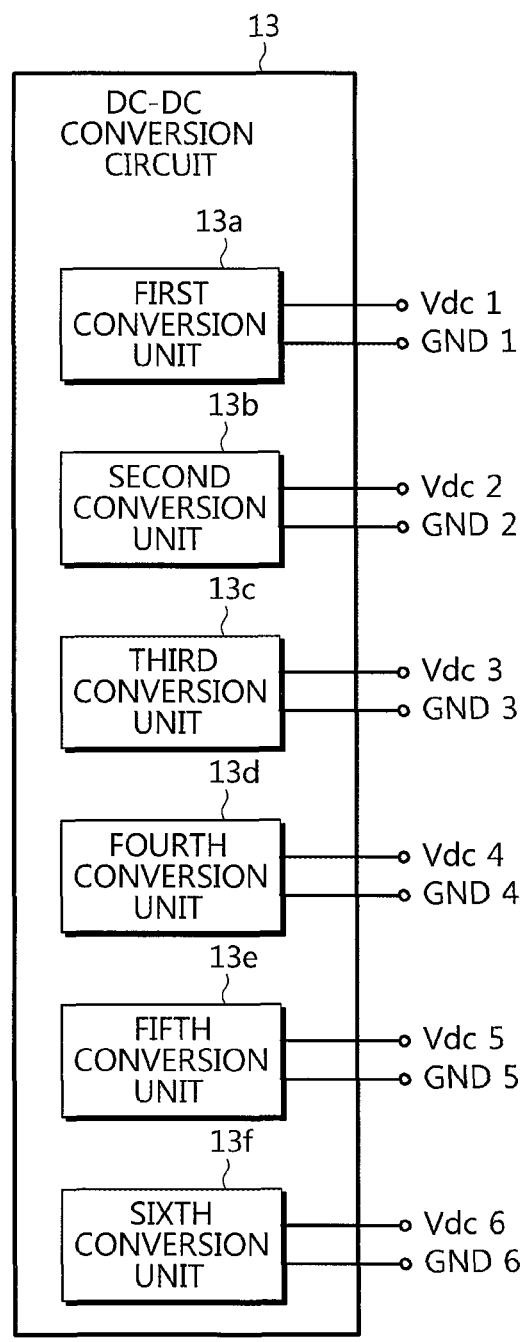
FIGS. 23A and 23B illustrate a configuration of a DC-DC conversion circuit of the motor driving apparatus according to another embodiment.
Figure 23B:
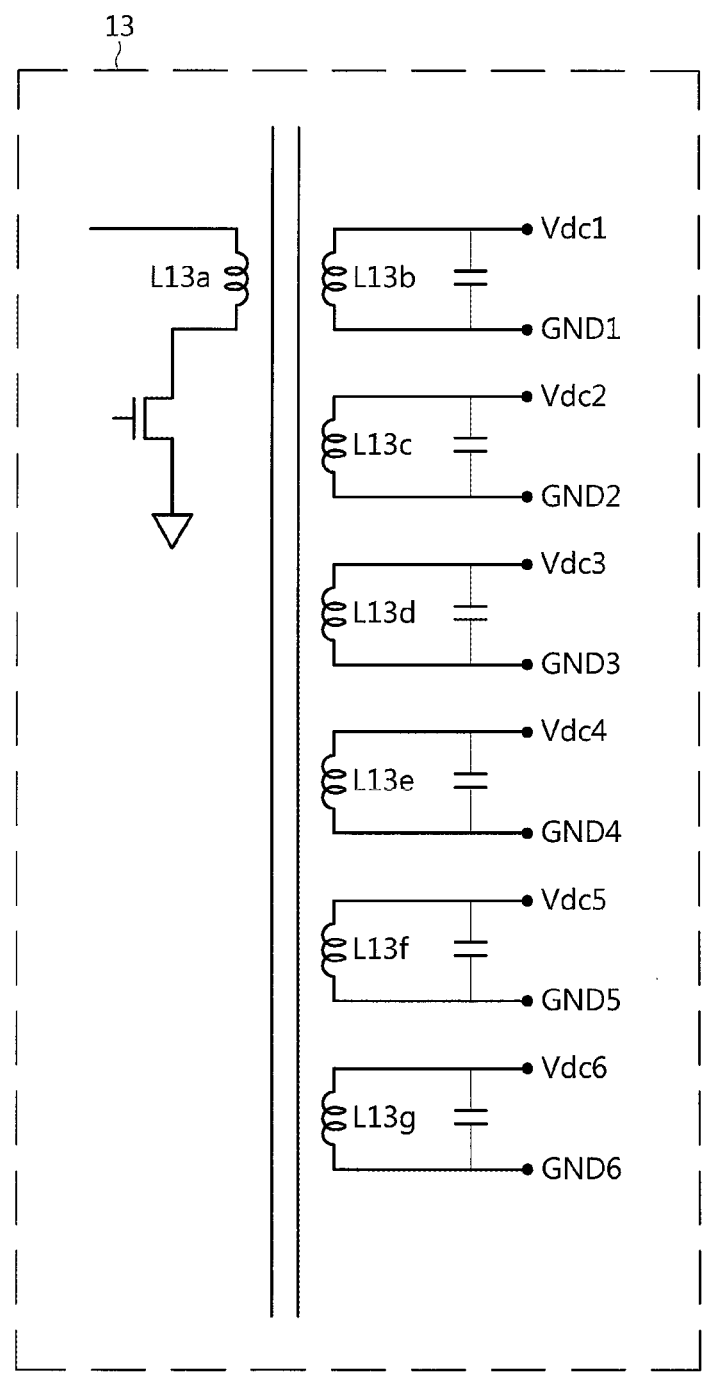

FIG. 22 illustrates a configuration of a DC power source unit of a motor driving apparatus according to another embodiment, and FIGS. 23A and 23B illustrate a configuration of a DC-DC conversion circuit of the motor driving apparatus according to another embodiment.

Referring to FIGS. 22, 23A, and 23B, the DC power source unit 10 may include a single-phase rectifying circuit 11, a DC link circuit 12, and a DC-DC conversion circuit 13.

The single-phase rectifying circuit 11 receives the AC power from the EMI filter 4 of the AC-DC conversion unit 2 to rectify and output the AC power.

Specifically, the single-phase rectifying circuit 11 may receive the AC power from any one terminal of the R-phase terminal R, the T-phase terminal T, and the S-phase terminal S of the EMI filter 4 included in the AC-DC conversion unit 2 and the ground terminal G. Since the driving circuit 140 and the control module 200 receiving the DC power from the DC power source unit 10 consume less power than the 3-level inverter 110, the DC power source unit 10 may supply sufficient DC power to the driving circuit 140 and the control module 200 even when the DC power source unit 10 receives the AC power via any one terminal of the R-phase terminal R, the T-phase terminal T, and the S-phase terminal S, and the ground terminal G.

In addition, the single-phase rectifying circuit 11 rectifies the AC voltage and the AC current received from the EMI filter 4, and outputs a full-wave-rectified voltage and current. The single-phase rectifying circuit 11 may employ a diode bridge (not shown) such as the rectifying circuit 3 (refer to FIG. 3) described above.

The DC link circuit 12 receives the rectified voltage from the single-phase rectifying circuit 11, and removes a ripple included in the rectified voltage to apply the DC voltage to the DC-DC conversion circuit 13.

The DC link circuit 12 may include a flattening capacitor (not shown) to remove the ripple included in the rectified voltage. Also, the flattening capacitor may employ a low capacity (tens of μF) electrolytic or film capacitor.

The DC-DC conversion circuit 13 converts a voltage value of the DC voltage received from the DC link circuit 12 and outputs the DC power of various voltage levels. For example, the DC-DC conversion circuit 13 may receive the DC voltage from the DC link circuit 12, supply the DC power of 12V to 18V to the driving circuit 140, and supply the DC power of 3.3V to 5V to the control module 200.

The DC-DC conversion circuit 13 may include a plurality of DC-DC conversion units (not shown) to change a voltage of the DC power received from the DC link circuit 12.

For example, as illustrated in FIG. 23A, the DC-DC conversion circuit 13 may include a first conversion unit 13a to output a first DC power via a first DC terminal Vdc1 and a first ground terminal GND1, a second conversion unit 13b to output a second DC power via a second DC terminal Vdc2 and a second ground terminal GND2, a third conversion unit 13c to output a third DC power via a third DC terminal Vdc3 and a third ground terminal GND3, a fourth conversion unit 13d to output a fourth DC power via a fourth DC terminal Vdc4 and a fourth ground terminal GND4, a fifth conversion unit 13e to output a fifth DC power via a fifth DC terminal Vdc5 and a fifth ground terminal GND5, and a sixth conversion unit 13f to output a sixth DC power via a sixth DC terminal Vdc6 and a sixth ground terminal GND6.

In addition, the first to fifth conversion units 13a to 13e may output the DC power of 12V to 18V, and the DC power output by the first to fifth conversion units 13a to 13e may be supplied to the driving circuit 140. Also, the sixth conversion unit 13f may output the DC power of 3.3V to 5V, and the DC power output by the sixth conversion unit 13f may be supplied to the control module 200.

In addition, each of the DC-DC conversion units may employ a buck conversion unit, a boost conversion unit, a buck-boost conversion unit, a flyback conversion unit, and the like.

In another example, as illustrated in FIG. 23B, the DC-DC conversion circuit 13 may employ a multi-output flyback conversion unit. The multi-output flyback conversion unit may include one primary coil L13a and a plurality of secondary coils L13b, L13c, L13d, L13e, L13f, and L13g.

The multi-output flyback conversion unit may output different levels of voltage in accordance with a ratio of a number of turns of the primary coil L13a and a number of turns of the plurality of secondary coils L13b, L13c, L13d, L13e, L13f, and L13g.

As described above, the motor driving apparatus 1' further includes the DC power source unit 10 in addition to the AC-DC conversion unit 2, the DC link unit 6, and the DC-AC conversion unit 100, and the DC power source unit 10 supplies the low-voltage DC power to the driving circuit 140 and the control module 200 included in the DC-AC conversion unit 100.

Hereinafter, the DC power source unit 10 supplying the DC power of 12V to 18V to the driving circuit 140 will be described.

Figure 24:
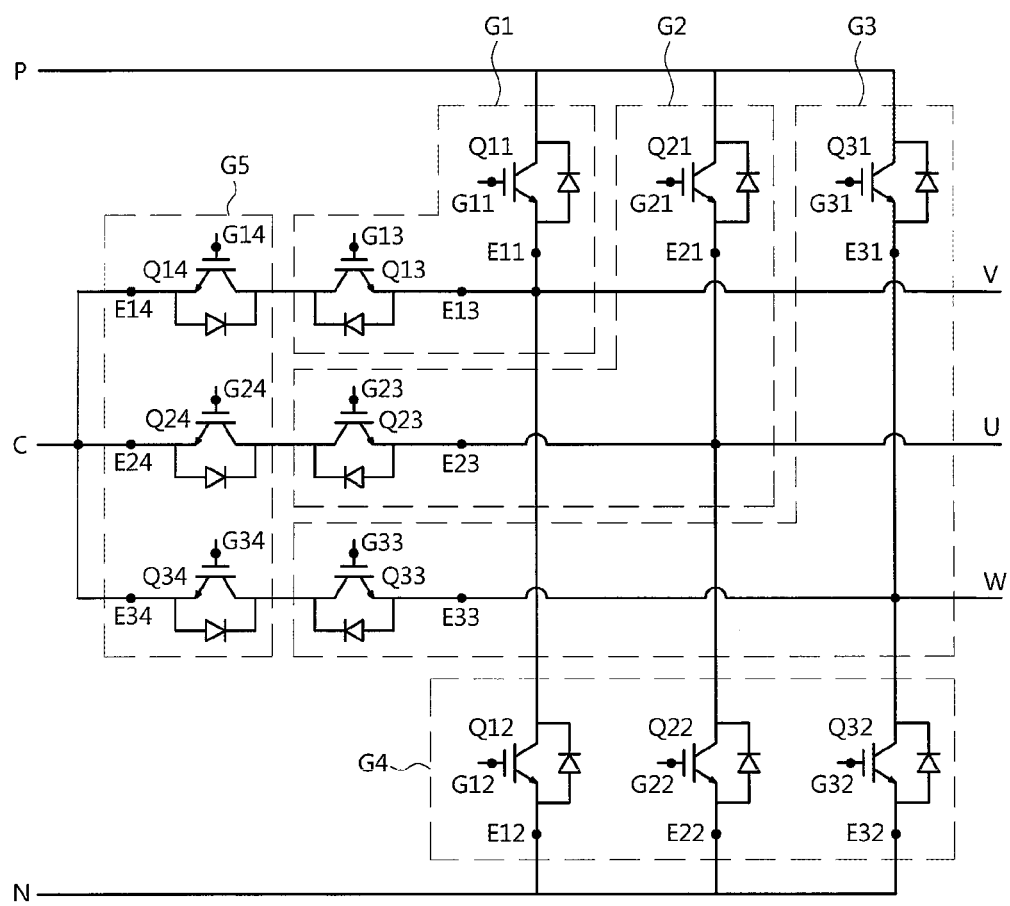
FIG. 24 illustrates switching elements included in a 3-level inverter of the motor driving apparatus according to another embodiment classified into a plurality of groups.
Figure 25:
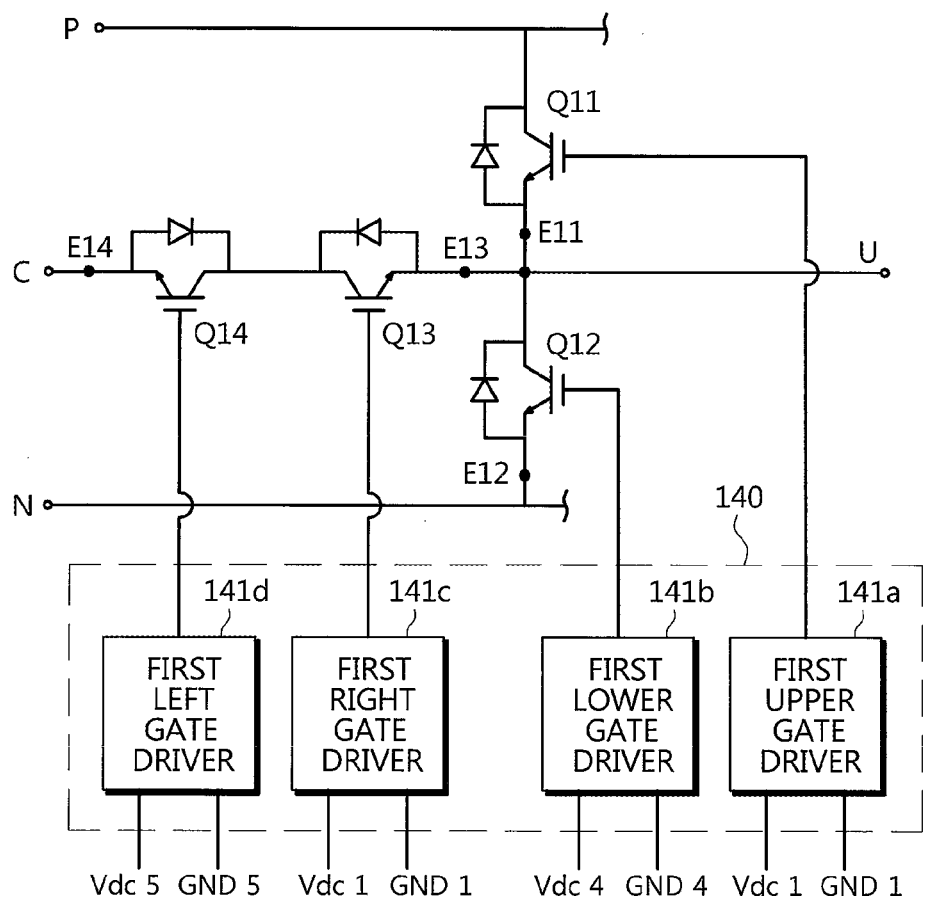
FIGS. 25, 26, and 27 illustrate a power supplied to a driving circuit of the motor driving apparatus according to another embodiment.
Figure 26:
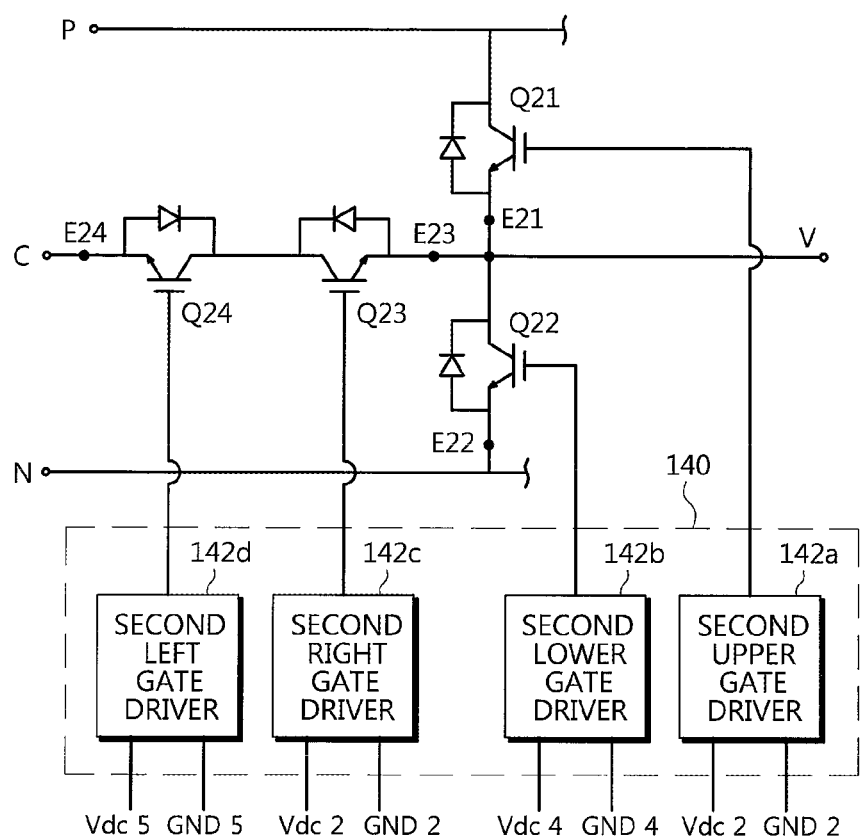
Figure 27:
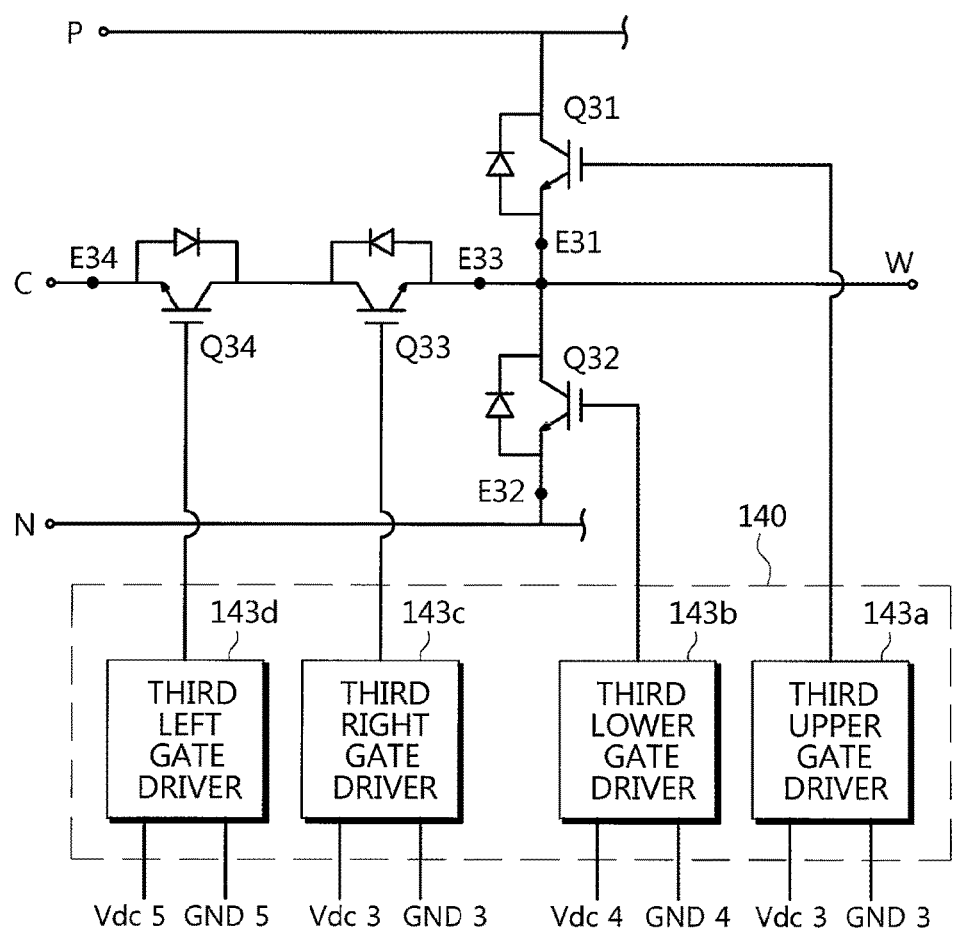

FIG. 24 illustrates switching elements included in the 3-level inverter of the motor driving apparatus according to another embodiment classified in accordance with a DC power supply to a driving circuit, and FIGS. 25, 26, and 27 illustrate a power supplied to the driving circuit of the motor driving apparatus according to another embodiment.

As illustrated in FIG. 24, a plurality of gate drivers 141a to 141d, 142a to 142d, and 143a to 143d included in the driving circuit 140 respectively provide a driving signal to a plurality of switching elements Q11 to Q14, Q21 to Q24, and Q31 to Q34 included in the 3-level inverter 110. Also, the DC power source unit 10 may supply the DC power of 12V to 18V to each of the plurality of gate drivers 141a to 141d, 142a to 142d, and 143a to 143d.

Particularly, driving signals opening and closing the plurality switching elements Q11 to Q14, Q21 to Q24, and Q31 to Q34 are applied as voltages between gates G11 to G14, G21 to G24, an G31 to G34 and emitter terminals E11 to E14, E21 to E24, and E31 to E34 of the plurality of switching elements Q11 to Q14, Q21 to Q24, and Q31 to Q34.

Potentials of the emitter terminals E11 to E14, E21 to E24, and E31 to E34 become reference points of the driving signals. In other words, the switching elements Q11 to Q14, Q21 to Q24, and Q31 to Q34 are turned off when a voltage the same as the emitter terminals E11 to E14, E21 to E24, and E31 to E34 are applied to the gates G11 to G14, G21 to G24, and G31 to G34. Also, the switching elements Q11 to Q14, Q21 to Q24, and Q31 to Q34 are turned on when 12V to 18V of voltage with respect to the emitter terminals E11 to E14, E21 to E24, and E31 to E34 is applied to the gates G11 to G14, G21 to G24, and G31 to G34.

Consequently, to turn on or turn off the switching elements Q11 to Q14, Q21 to Q24, and Q31 to Q34, the gate drivers 141a to 141d, 142a to 142d, and 143a to 143d have to provide the driving signals of 12V to 18V with respect to the emitter terminals E11 to E14, E21 to E24, and E31 to E34 of the switching elements Q11 to Q14, Q21 to Q24, and Q31 to Q34 to the gates G11 to G14, G21 to G24, and G31 to G34 of the switching elements Q11 to Q14, Q21 to Q24, and Q31 to Q34.

Here, since reference potentials of the driving signals output by the gate drivers 141a to 141d, 142a to 142d, and 143a to 143d are different, it is normal for the DC power source unit 10 to supply the DC power to each of the gate drivers 141a to 141d, 142a to 142d, and 143a to 143d.

However, when the DC power source unit 10 supplies the DC power to each of the gate drivers 141a to 141d, 142a to 142d, and 143a to 143d, the size of circuits enlarges and the consumed power increases.

To compensate for the problem, the DC power source unit 10 included in the motor driving apparatus 1' may divide the switching elements Q11 to Q14, Q21 to Q24, and Q31 to Q34 to which the emitter terminals E11 to E14, E21 to E24, and E31 to E34 are classified into a plurality of groups.

For example, according to what is illustrated in FIG. 23, an emitter terminal E11 of a first upper switching element Q11 and the emitter terminal E13 of a first right switching element Q13 are connected to each other. Consequently, the first upper switching element Q11 and the first right switching element Q13 may be classified as a first group G1. Also, a first upper gate driver 141a and a first right gate driver 141c that provide the driving signals to the first upper switching element Q11 and the first right switching element Q13 belonging to the first group G1 may also be classified as the first group G1.

In addition, an emitter terminal E21 of a second upper switching element Q21 and an emitter terminal E23 of a second right switching element Q23 are connected to each other. Consequently, the second upper switching element Q21 and the second right switching element Q23 may be classified as a second group G2. Also, a second upper gate driver 142a and a first right gate driver 142c that provide the driving signals to the second upper switching element Q21 and the second right switching element Q23 belonging to the second group G2 may also be classified as the second group G2.

In addition, an emitter terminal E31 of a third upper switching element Q31 and an emitter terminal E33 of a third right switching element Q33 are connected to each other. Consequently, the third upper switching element Q31 and the third right switching element Q33 may be classified as a third group G3. Also, a third upper gate driver 143a and a third right gate driver 143c that provide the driving signals to the third upper switching element Q31 and the third right switching element Q33 belonging to the third group G3 may also be classified as the third group G3.

In addition, an emitter E12 of a first lower switching element Q12, an emitter E22 of a second lower switching element Q22, and an emitter E32 of a third lower switching element Q32 are connected to each other. Consequently, the first lower switching element Q12, the second lower switching element Q22, and the third lower switching element Q32 may be classified as a fourth group G4. Also, a first lower gate driver 141b, a second lower gate driver 142b, and a third lower gate driver 143b that provide the driving signals to the first lower switching element Q12, the second lower switching element Q22, and the third lower switching element Q32 may also be classified as the fourth group G4.

In addition, an emitter E14 of a first left switching element Q14, an emitter E24 of a second left switching element Q24, and an emitter E34 of a third left switching element Q34 are connected to each other. Consequently, the first left switching element Q14, the second left switching element Q24, and the third left switching element Q34 may be classified as a fifth group G5. Also, a first left gate driver 141d, a second left gate driver 142d, and a third left gate driver 143d that provide the driving signals to the first left switching element Q14, the second left switching element Q24, and the third left switching element Q34 may also be classified as the fifth group G5.

In addition, the DC power source unit 10 may supply the first to fifth DC powers to the gate drivers 141a to 141d, 142a to 142d, and 143a to 143d that respectively supply the driving signals to the first to fifth groups G1 to G5.

For example, as illustrated in FIG. 25, the DC power source unit 10 may supply the first DC power to the first upper gate driver 141a and the first right gate driver 141c belonging to the first group G1. In other words, the first upper gate driver 141a and the first right gate driver 141c may receive the DC power via the first DC terminal Vdc1 and the first ground terminal GND1.

In addition, as illustrated in FIG. 26, the DC power source unit 10 may supply the second DC power to the second upper gate driver 142a and the second right gate driver 142c belonging to the second group G2. In other words, the second upper gate driver 142a and the second right gate driver 142c may receive the DC power via the second DC terminal Vdc2 and the second ground terminal GND2.

In addition, as illustrated in FIG. 27, the DC power source unit 10 may supply the third DC power to the third upper gate driver 143a and the third right gate driver 143c belonging to the third group G3. In other words, the third upper gate driver 143a and the third right gate driver 143c may receive the DC power via the third DC terminal Vdc3 and the third ground terminal GND3.

In addition, as illustrated in FIGS. 25 to 27, the DC power source unit 10 may supply the fourth DC power to the first lower gate driver 141b, the second lower gate driver 142b, and the third lower gate driver 143b belonging to the fourth group G4. In other words, the first lower gate driver 141b, the second lower gate driver 142b, and the third lower gate driver 143b may receive the DC power via the fourth DC terminal Vdc4 and the fourth ground terminal GND4.

In addition, as illustrated in FIGS. 25 to 27, the DC power source unit 10 may supply the fifth DC power to the first left gate driver 141d, the second left gate driver 142d, and the third left gate driver 143d belonging to the fifth group G5. In other words, the first left gate driver 141d, the second left gate driver 142d, and the third left gate driver 143d may receive the DC power via the fifth DC terminal Vdc5 and the fifth ground terminal GND5.

As described above, the switching elements Q11 to Q14, Q21 to Q24, and Q31 to Q34 may be classified as the plurality of groups G1 to G5 depending on whether the emitter terminals E11 to E14, E21 to E24, and E31 to E34 are connected to each other, and the DC power source unit 10 may respectively supply the first to fifth DC powers to the gate drivers 141a to 141d, 142a to 142d, and 143a to 143d that provide the driving signals to the switching elements Q11 to Q14, Q21 to Q24, and Q31 to Q34 belonging to each of the groups G1 to G5.

As a result, the number of the DC-DC conversion units 13a to 13f included in the DC power source unit 10 may be reduced, and an area of a circuit realizing the DC power source unit 10 may be reduced.

According to one aspect of the disclosure, a motor driving apparatus having sufficient life and a small volume may be provided by using a low-capacity film capacitor.

According to another aspect of the disclosure, a motor driving apparatus capable of stably providing a DC voltage and a neutral point voltage to a 3-level inverter even when a low-capacity capacitor is used at a DC terminal may be provided by controlling the DC voltage using a damping current and controlling the neutral point voltage using a offset voltage.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A motor driving apparatus comprising:
   an AC-DC conversion unit configured to rectify an AC power supplied from an external AC power source;
   a DC link unit configured to stabilize a voltage rectified by the AC-DC conversion unit; and
   a DC-AC conversion unit configured to supply the AC power to a motor using a DC voltage from the DC link unit, wherein:
      the DC link unit comprises at least one film capacitor configured to remove a ripple of the rectified voltage;
      the DC link unit further comprises a first film capacitor and a second film capacitor connected to each other in series, and is configured to output a DC voltage from both ends of the first film capacitor and the second film capacitor, and a neutral point voltage from a neutral point at which the first film capacitor and the second film capacitor are connected; and
   the DC-AC conversion unit comprises:
      a 3-level inverter configured to supply the AC power to the motor using the DC voltage of the at least one film capacitor, and
      a control module configured to control the AC power supplied to the motor, the DC voltage, and the neutral point voltage,
   wherein the control module comprises:
      a motor speed control module configured to control the 3-level inverter such that the motor rotates at a target speed input from an external device;
      a DC voltage control module configured to control the 3-level inverter such that the DC voltage is stabilized; and
      a neutral point voltage control module configured to control the 3-level inverter such that the neutral point voltage is stabilized.

2. The motor driving apparatus according to claim 1, wherein the motor speed control module outputs a voltage reference to control the 3-level inverter in accordance with the target speed input from the external device and a driving current output by the 3-level inverter.

3. The motor driving apparatus according to claim 2, wherein the motor speed control module comprises:
   a speed controller configured to calculate a current reference from a difference between a target speed and a rotation speed of the motor; and
   a current controller configured to calculate the voltage reference from a difference between the current reference and the driving current.

4. The motor driving apparatus according to claim 2, wherein the DC voltage control module is configured to output a damping voltage according to the DC voltage and the voltage reference, to prevent divergence of the DC voltage.

5. The motor driving apparatus according to claim 4, wherein the DC voltage control module is configured to calculate the damping voltage from a difference between an average value of voltages applied from the external AC power source and the DC voltage.

6. The motor driving apparatus according to claim 2, wherein the neutral point voltage control module is configured to output an offset voltage according to the DC voltage, the neutral point voltage, the voltage reference, and a current reference, to reduce pulsation of the neutral point voltage.

7. The motor driving apparatus according to claim 6, wherein the neutral point voltage control module comprises:
   a neutral point current calculator configured to calculate a neutral point current from the DC voltage and the neutral point voltage; and
   an offset voltage calculator configured to calculate a offset voltage, which stabilizes the neutral point voltage, from the current reference, the neutral point current, and the voltage reference.

8. A motor driving apparatus comprising:
   an AC-DC conversion unit configured to rectify an AC power supplied from an external AC power source;
   a DC link unit configured to stabilize a voltage rectified by the AC-DC conversion unit; and
   a DC-AC conversion unit configured to supply the AC power to a motor using a DC voltage from the DC link unit, wherein:

the DC link unit comprises at least one film capacitor configured to remove a ripple of the rectified voltage;

the DC link unit further comprises a first film capacitor and a second film capacitor connected to each other in series, and is configured to output a DC voltage from both ends of the first film capacitor and the second film capacitor, and a neutral point voltage from a neutral point at which the first film capacitor and the second film capacitor are connected; and the DC-AC conversion unit comprises a 3-level inverter configured to supply the AC power to the motor using the DC voltage of the at least one film capacitor, wherein the 3-level inverter comprises:

a 6-switch inverter module configured to receive the DC voltage from both ends of the first film capacitor and the second film capacitor, and configured to supply an AC power to the motor via a U-phase terminal, a V-phase terminal, and a W-phase terminal; and a neutral point switch module configured to receive the neutral point voltage from a neutral point at which the first film capacitor and the second film capacitor are connected, and configured to supply the AC power to the motor via a U-phase terminal, a V-phase terminal, and a W-phase terminal.

9. The motor driving apparatus according to claim 8, wherein the 6-switch inverter module comprises:

three upper switching elements connected to the first film capacitor and three lower switching elements connected to the second film capacitor, wherein the three upper switching elements and the three lower switching elements are respectively connected in series, and three output nodes to which the three upper switching elements and the three lower switching elements are connected in series are respectively connected to the U-phase terminal, the V-phase terminal, and the W-phase terminal.

10. The motor driving apparatus according to claim 8, wherein the neutral point switch module comprises three pairs of switching elements respectively provided between the U-phase terminal and the neutral point, between the V-phase terminal and the neutral point, and between the W-phase terminal and the neutral point.

11. The motor driving apparatus according to claim 8, wherein the 6-switch inverter module and the neutral point switch module are configured on separate chips.

12. The motor driving apparatus according to claim 8, wherein the 6-switch inverter module and the neutral point switch module are configured on one chip.

13. The motor driving apparatus according to claim 8, wherein the U-phase terminal, the V-phase terminal, and the W-phase terminal of the 6-switch inverter module are respectively connected to the U-phase terminal, the V-phase terminal, and the W-phase terminal of the neutral point switch module.

14. The motor driving apparatus according to claim 1, wherein:

the DC-AC conversion unit further comprises a driving circuit configured to receive a control signal from the control module and drive the 3-level inverter; and the driving circuit comprises a plurality of gate drivers configured to respectively provide driving signals to the plurality of switching elements included in the 3-level inverter.

15. The motor driving apparatus according to claim 14, further comprising a DC power source unit configured to supply a DC power to the control module and the driving circuit.

16. The motor driving apparatus according to claim 15, wherein the DC power source unit comprises:

a single-phase rectifying circuit configured to rectify the AC power;

a DC link circuit configured to stabilize the voltage rectified by the single-phase rectifying circuit; and a DC-DC conversion circuit configured to change a voltage value of the DC voltage applied from the DC link circuit to apply the DC power having the changed voltage value to each of the plurality of gate drivers.

17. The motor driving apparatus according to claim 15, wherein:

the plurality of switching elements and the plurality of gate drivers are classified into a plurality of groups depending on whether emitter terminals of the plurality of switching elements are connected to each other, and the DC power source unit supplies an independent DC power to each of the gate drivers belonging to the plurality of groups.

* * * * *